US012781104B2

United States Patent
(12) United States Patent
Tripathy et al.

(10) Patent No.: US 12,781,104 B2
(45) **Date of Patent: *Nov. 3, 2026**

(54) HYDROCARBON POLYMER MODIFIERS HAVING HIGH AROMATICITY AND LOW MOLECULAR WEIGHT AND USES THEREOF

(71) Applicant: ExxonMobil Chemical Patents Inc., Baytown, TX (US)

(72) Inventors: Ranjan Tripathy, Sugar Land, TX (US); Rajesh P. Raja, Baytown, TX (US); Oliver Jean Francois Georjon, Uccle (BE); Laurent Copey, Clermont-Ferrand (FR); Fabien Bonnette, Clermont-Ferrand (FR)

(73) Assignee: ExxonMobil Chemical Patents Inc., Baytown, TX (US)

( * ) Notice: Subject to any disclaimer, the term of this patent is extended or adjusted under 35 U.S.C. 154(b) by 607 days.

This patent is subject to a terminal disclaimer.

(21) Appl. No.: 18/261,021

(22) PCT Filed: Jan. 21, 2022

(86) PCT No.: PCT/US2022/013226

§ 371 (c)(1),
(2) Date: Jul. 11, 2023

(87) PCT Pub. No.: WO2022/164716

PCT Pub. Date: Aug. 4, 2022

(65) Prior Publication Data

US 2025/0011630 A1 Jan. 9, 2025

Related U.S. Application Data

(60) Provisional application No. 63/141,681, filed on Jan. 26, 2021.

(51) Int. Cl.
*C09J 147/00* (2006.01)
*C08F 112/12* (2006.01)
(Continued)

(52) U.S. Cl.
CPC .......... *C09J 125/16* (2013.01); *C08F 112/12* (2013.01); *C08F 112/32* (2013.01);
(Continued)

(58) Field of Classification Search
None
See application file for complete search history.

(56) References Cited

U.S. PATENT DOCUMENTS 5,171,793 A * 12/1992 Johnson ................. C09J 153/00
525/332.8
5,227,425 A 7/1993 Rauline
(Continued)

FOREIGN PATENT DOCUMENTS

WO 9916600 A1 4/1999
WO 2020045316 A1 3/2020
(Continued)

OTHER PUBLICATIONS

John Wiley & Sons, Inc., Hydrocarbon Resins, Kirk-Othmer Encyclopedia of Chemical Technology, pp. 1-20.
(Continued)

*Primary Examiner* — Richard A. Huhn

(57) ABSTRACT

Described herein are hydrocarbon polymer modifiers for use in various applications. The hydrocarbon polymer modifier comprises a cyclic component, and has a glass transition temperature and Mn defined by the following two equations: (1) Tg≥95−2.2*(% H Ar), and (2) Tg≥−53+(0.265*Mn); an aromatic proton content (% H Ar) of from 12 mole % to 19 mole %; and an Mn of from 300 g/mole to 450 g/mole, wherein Tg is glass transition temperature as expressed in °
(Continued)

C. of the modifier, the % H Ar represents the content of aromatic protons in the hydrocarbon polymer modifier, Mn represents the number average molecular weight of the hydrocarbon polymer modifier, and the cyclic component is selected from the group of a distillation cut from a petroleum refinery stream, and/or $C_4$, $C_5$ or $C_6$ cyclic olefins and mixtures thereof. Further, the hydrocarbon polymer modifier may be characterized by a Tg of from 70° C. to 95° C. and/or a z-average molecular weight (Mz) of the hydrocarbon polymer modifier of less than 1000 g/mole. The hydrocarbon modifiers are particularly useful in high Tg applications where low molecular weight resin is desirable.

22 Claims, 3 Drawing Sheets

(51) Int. Cl.

| | |
|---|---|
| ***C08F 112/32*** | (2006.01) |
| ***C08F 212/08*** | (2006.01) |
| ***C08F 232/08*** | (2006.01) |
| ***C09J 125/16*** | (2006.01) |
| *C08F 212/12* | (2006.01) |
| *C08F 232/04* | (2006.01) |
| *C08F 232/06* | (2006.01) |
| *C09J 145/02* | (2006.01) |

(52) U.S. Cl.

CPC .......... *C08F 212/08* (2013.01); *C08F 212/12* (2013.01); *C08F 232/04* (2013.01); *C08F 232/06* (2013.01); *C08F 232/08* (2013.01); *C08F 2800/20* (2013.01); *C09J 145/02* (2013.01); *C09J 147/00* (2013.01)

(56) References Cited

U.S. PATENT DOCUMENTS

| | | | |
|---|---|---|---|
| 5,852,099 | A | 12/1998 | Vanel |
| 5,900,449 | A | 5/1999 | Custodero et al. |
| 6,420,488 | B1 | 7/2002 | Penot |
| 6,433,104 | B1 | 8/2002 | Macedo et al. |
| 6,536,492 | B2 | 3/2003 | Vasseur |
| 6,774,255 | B1 | 8/2004 | Tardivat et al. |
| 6,825,291 | B2 | 11/2004 | Klosiewicz et al. |
| 7,217,751 | B2 | 5/2007 | Durel et al. |
| 7,300,970 | B2 | 11/2007 | Durel et al. |
| 7,488,768 | B2 | 2/2009 | Tardivat et al. |
| 7,491,767 | B2 | 2/2009 | Durel et al. |
| 7,582,688 | B2 | 9/2009 | Mabry et al. |
| 8,344,070 | B2 | 1/2013 | Squire et al. |
| 8,492,475 | B2 | 7/2013 | Da Silva et al. |
| 9,010,393 | B2 | 4/2015 | Da Silva et al. |
| 9,909,004 | B2 | 3/2018 | Blok et al. |
| 10,570,228 | B2 | 2/2020 | Tripathy et al. |
| 10,982,081 | B2 | 4/2021 | Nair et al. |
| 2004/0167705 | A1 | 8/2004 | Lingman et al. |
| 2008/0033112 | A1 | 2/2008 | Squire et al. |
| 2009/0186961 | A1 | 7/2009 | Da Silva et al. |
| 2018/0127527 | A1 | 5/2018 | Tripathy et al. |
| 2018/0340055 | A1 | 11/2018 | De Gaudemari et al. |
| 2020/0172718 | A1 | 6/2020 | Nair et al. |
| 2025/0011630 | A1 | 1/2025 | Tripathy et al. |

FOREIGN PATENT DOCUMENTS

| | | | | |
|---|---|---|---|---|
| WO | WO-2021021416 | A1 * | 2/2021 | ............. G01N 25/04 |
| WO | WO-2021021417 | A1 * | 2/2021 | ............ C08F 232/06 |

OTHER PUBLICATIONS

T. Sun et al., (2001), Macromolecules vol. 34 (19), pp. 6812-6820.

* cited by examiner

HYDROCARBON POLYMER MODIFIERS HAVING HIGH AROMATICITY AND LOW MOLECULAR WEIGHT AND USES THEREOF

CROSS-REFERENCE TO RELATED APPLICATIONS

This application is a National Phase application claiming priority to PCT application Serial No. PCT/US2022/013226, filed Jan. 21, 2022, which claims priority to and the benefit of U.S. Provisional Application No. 63/141,681, filed Jan. 26, 2021, the disclosure of which are incorporated by reference in their entirety.

FIELD OF THE INVENTION

The present invention relates to hydrocarbon polymer resins and more particularly to novel hydrocarbon polymer modifiers useful in various applications.

BACKGROUND OF THE INVENTION

Hydrocarbon resins are used in a variety of applications such as tire components, hoses, belts, footwear components, and vibration isolation devices. In elastomeric compositions, for example, hydrocarbon resins are used as a processing aid and to improve the characteristics of elastomeric compositions. The selection of ingredients for the commercial formulation of an elastomeric composition depends upon the balance of properties desired, the application, and the end use for the particular application.

Generally, the raw ingredients and materials used in rubber compounding impact performance variables, thus, the ingredients must be compatible with the rubbers, not interfere with cure, easily disperse in all compounds, be cost effective, and not adversely impact product performance. For example, in tire applications, rolling resistance, dry and wet skid characteristics, heat buildup are important performance characteristics, as well as the ability to improve the endurance of tires used in a wide variety of conditions.

The glass transition temperature ("Tg") of a resin system defines when a polymer goes from a rigid state to a more flexible state. Tg offers important information about the resin including the nature of the polymer at its service temperature, i.e. whether it is rigid or flexible. At temperatures below the Tg, the molecular chains do not have enough energy present to allow them to move around. Here, polymer molecules are essentially locked into a rigid amorphous structure due to short chain length, molecular groups branching off the chain and interlocking, and/or due to a rigid backbone structure. When heat is applied, the polymer molecules gain some energy and can start to move. At some point, the heat energy changes the amorphous rigid structure to a flexible structure and molecules move freely around each other. This transition point is called the glass transition temperature.

The elastomeric composition is an amorphous polymer that does not melt (unlike a crystalline polymer which will melt when heat is applied); but it does undergo a change in structure (from rigid to flexible) that produces a change in the heat capacity of the resin. Above the Tg, a rubbery, flexible polymer will have a higher heat capacity. Therefore, in many applications, polymeric compositions require a high glass transition temperature.

High Tg resins can be produced by increasing the molecular weight of the resin. Moreover, a high molecular weight resin also positively effects the impact and chemical resistance of the resulting product as the increase in molecular weight increases strength and stiffness. However, these resins have limited compatibility with base polymer. To alleviate incompatibility of polymers, modifiers can be added to the resin but are not designed to lower the molecular weight of the resin. Lower molecular weight of resins can be important, however, particularly, when ease of processing is important. Therefore, a hydrocarbon polymer modifier ("HPM") having high aromaticity, a high Tg, a low number average molecular weight ("Mn"), and preferably a low z-average molecular weight ("Mz"), is desirable.

Hydrocarbon resins are also useful in adhesive compositions. Styrenic block copolymers are widely used to make hot-melt adhesives for a variety of uses, including diaper assembly. These styrenic block copolymers include unvulcanized elastomeric block copolymers wherein the respective monomeric moieties are arranged in an alternating sequence having the general configuration A-B-A. In this configuration, A is a non-elastomeric block derived from styrene, usually referred to as styrenic "end-block", and B is an elastomeric polymer block derived from, for example, isoprene and/or butadiene, usually indicated as, for example, isoprene or butadiene "mid-block". This type of block copolymer may also be described as having a branched polymerized mid-block, derived from, for example, isoprene or butadiene, with a polystyrene terminal block at the end of each branch. The end block provide the necessary cohesive strength and also increases the high temperature properties of adhesive. However, it is known that the incorporation of low aromaticity tackifying resins and/or plasticizing oils with styrenic block copolymer based hot-melt adhesives can result in reduced cohesive strength and elevated temperature resistance of the adhesive.

A need exists, therefore, for hydrocarbon polymer modifiers ("HPM") having high aromaticity, a high Tg, a low number average molecular weight ("Mn"), and preferably a low z-average molecular weight ("Mz"), which can be used in various applications, including rubber compositions and adhesives.

SUMMARY OF THE INVENTION

Described herein are hydrocarbon polymer modifiers for use in various applications. The hydrocarbon polymer modifier comprises a cyclic component, has a glass transition temperature and aromaticity content defined by the following two equations: (1) $Tg \geq 95-2.2*(\% H Ar)$, and (2) $Tg \geq -53+(0.265*Mn)$; an aromatic proton content (% H Ar) of from 12 mole % to 19 mole %; and an Mn of from 300 g/mole to 450 g/mole, where Tg is glass transition temperature as expressed in ° C. of the modifier, the % H Ar represents the content of aromatic protons in the hydrocarbon polymer modifier, Mn represents the number average molecular weight of the hydrocarbon polymer modifier, and the cyclic component is selected from the group of a distillation cut from a petroleum refinery stream, and/or $C_4$, $C_5$ or $C_6$ cyclic olefins and mixtures thereof. Further, the hydrocarbon polymer modifier may be characterized by a Tg of from 70° C. to 95° C. and/or a z-average molecular weight (Mz) of less than 1000 g/mole.

In an aspect, the cyclic component is cyclopentene, cyclopentadiene, dicyclopentadiene, cyclohexene, 1,3-cycylohexadiene, 1,4-cyclohexadiene, methylcyclopentadiene, and/or di(methylcyclopentadiene). In an aspect, the hydrocarbon polymer modifier comprises the cyclic component in an amount between about 10 wt. % to about 90 wt. %. In an aspect, the hydrocarbon polymer modifier comprises the cyclic component in an amount between about 25 wt. % to about 80 wt. %. In an aspect, the cyclic component is selected from the group of dicyclopentadiene, cyclopentadiene, and methylcyclopentadiene. In an aspect, the cyclic component is cyclopentadiene.

In an aspect, the hydrocarbon polymer modifier comprises dicyclopentadiene, cyclopentadiene, and/or methylcyclopentadiene in an amount between about 10 wt. % to about 90 wt. %. In an aspect, the hydrocarbon polymer modifier comprises dicyclopentadiene, cyclopentadiene, and/or methylcyclopentadiene in an amount between about 25 wt. % to about 80 wt. %. In an aspect, the hydrocarbon polymer modifier comprises methylcyclopentadiene in an amount between about 0.1 wt. % to about 15 wt. %. In an aspect, the hydrocarbon polymer modifier comprises methylcyclopentadiene in an amount between about 0.1 wt. % to about 5 wt. %.

In an aspect, the hydrocarbon polymer modifier further comprises an aromatic component. In an aspect, the aromatic component is selected from one of an olefin-aromatic, a substituted benzene or an aromatic distillation cut. In an aspect, the aromatic component is an aromatic distillation cut. In an aspect, the hydrocarbon polymer modifier comprises the aromatic component in an amount between about 20 wt. % to about 75 wt. %. In an aspect, the hydrocarbon polymer modifier comprises the aromatic component in an amount between about 25 wt. % to about 70 wt. %.

Further provided are adhesives comprising the hydrocarbon polymer modifier provided herein. In an aspect, the adhesive comprises the hydrocarbon polymer modifier in an amount between about 0.1 wt. % to about 99.5 wt. %. Further provided are sealants comprising the hydrocarbon polymer modifier in an amount between about 0.1 wt. % to about 99.5 wt. %. Also provided are films comprising the hydrocarbon polymer modifier in an amount between about 0.1 wt. % to about 99.5 wt. %. Adhesives, sealants and films within the scope of this disclosure do not include those relating to or used in pneumatic and non-pneumatic tires and wheels.

Moreover, provided herein are methods of making the present hydrocarbon polymer modifiers comprising the step of polymerizing a feed stream of cyclics in the presence or absence of a solvent and at a reaction temperature between about 250° C. and 290° C. for about one (1) hour to about three (3) hours.

DETAILED DESCRIPTION OF THE INVENTION

Figure 1:
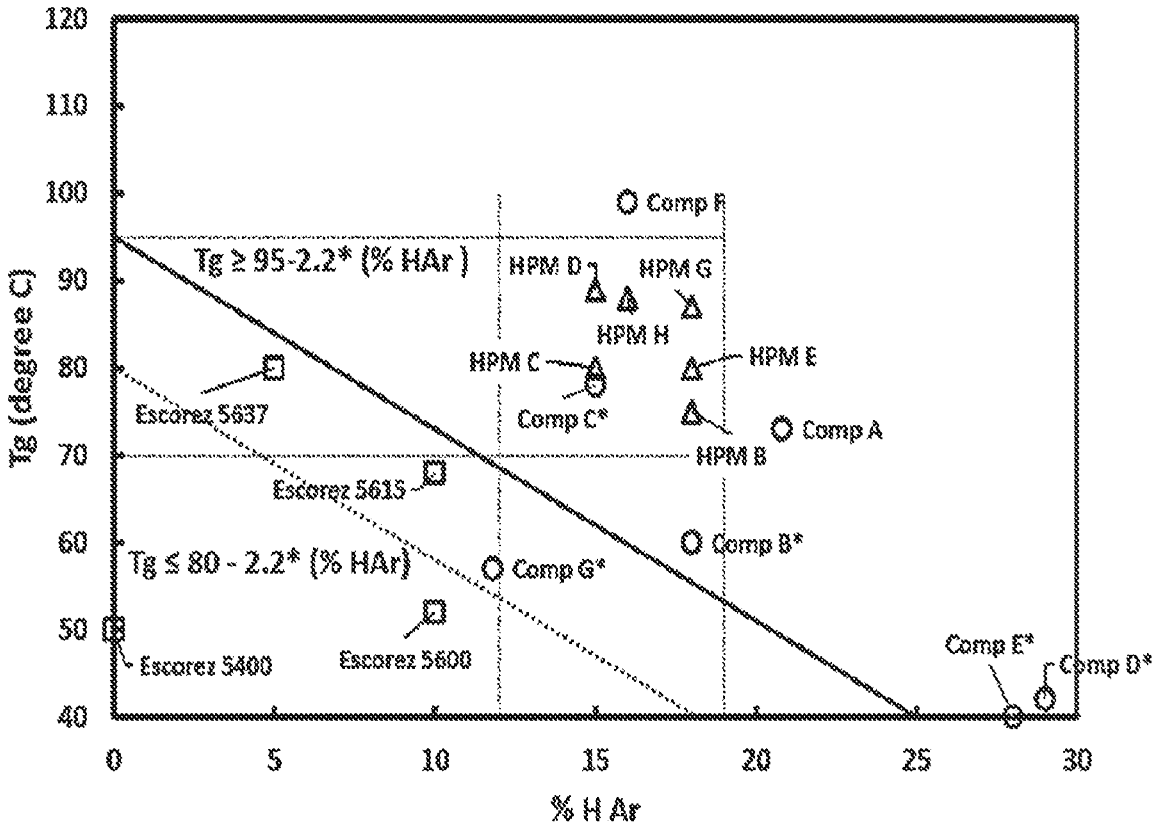
FIG. 1 is graph of the Tg and % H Ar relationship of the present HPM, comparative resin and prior art elastomeric compositions.

Provided herein are hydrocarbon polymer modifiers having a cyclic component and a glass transition temperature and aromaticity content defined by the following two equations: (1) Tg≥95−2.2*(% H Ar) and (2) Tg≥−53+(0.265*Mn); and are further characterized by an aromatic proton content (% H Ar) of from 12 mole % to 19 mole %, and an Mn of from 300 g/mole to 450 g/mole, wherein the glass transition temperature ("Tg") of the hydrocarbon polymer modifier is expressed in degrees centigrade (° C.), the term "% H Ar" represents the content of aromatic protons of in the hydrocarbon polymer modifier, "Mn" represents the number average molecular weight of the hydrocarbon polymer modifier expressed in grams per mole ("g/mole"), and the cyclic component is selected from the group of a distillation cut from a petroleum refinery stream, and/or $C_4$, $C_5$ or $C_6$ cyclic olefins and mixtures thereof. Further, the hydrocarbon polymer modifier may be characterized by a Tg of from 70° C. to 95° C. and/or a z-average molecular weight (Mz) of less than 1000 g/mole.

The subject hydrocarbon polymer modifier ("HPM") comprises one or more cyclic components that are used to prepare one or more complex copolymers as described herein. The makeup of the complex copolymer can be controlled by the type and the amount of monomer included in the modifier, i.e., the microstructure of the copolymer. Monomer placement in the polymer chain, however, is random, leading to further complexity in the polymer microstructure.

In an aspect, the one or more cyclic components are combined with an aromatic component to provide the hydrocarbon polymer modifier (also referred to herein as the "modifier" or "tackifying agent"). The aromatic component can include, but is not limited to, olefin-aromatics, substituted benzene and/or aromatic distillation cut.

In an aspect, the present hydrocarbon polymer modifier comprises the cyclic component in an amount between about 10 wt. % to about 90 wt. % of the total weight of the hydrocarbon polymer additive. In an aspect, the hydrocarbon polymer modifier comprises the cyclic component between about 25 wt. % to 80 wt. %, of the total weight of the hydrocarbon polymer modifier. In an aspect, the hydrocarbon polymer modifier comprises dicyclopentadiene, cyclopentadiene, and/or methylcyclopentadiene in an amount between about 10 wt. % to about 90 wt. %. In an aspect, the hydrocarbon polymer modifier comprises dicyclopentadiene, cyclopentadiene, and/or methylcyclopentadiene in an amount between about 25 wt. % to about 80 wt. %. In an aspect, the hydrocarbon polymer modifier comprises between about 0.1 wt. % to about 15 wt. % and about 0.1 wt. % to about 5 wt. % methyl cyclopentadiene ("MCPD") derived content.

In an aspect, the aromatic component can be olefin-aromatics, substituted benzene, and/or aromatic distillation cut. In an aspect, the total weight of the hydrocarbon polymer modifier comprises the aromatic component in an amount of between about 20 wt. % to about 75 wt. %, and about 25 wt. % to about 70 wt. % of the total weight of the hydrocarbon polymer additive.

Before polymers, compounds, components, compositions, modifiers and/or methods are disclosed and described, it is to be understood that unless otherwise indicated this teaching is not limited to specific polymers, compounds, components, compositions, reactants, reaction conditions, or the like, as such may vary, unless otherwise specified. Further, the terminology used herein is for the purpose of describing particular aspects only and is not intended to be limiting.

Definitions

For the purposes of this disclosure, the following definitions will apply, unless otherwise stated:

As used herein, the singular form of "a," "an," and "the" include plural referents unless otherwise specified.

Molecular weight distribution ("MWD") is equivalent to the expression $M_w/M_n$. The expression $M_w/M_n$ is the ratio of the weight average molecular weight ($M_w$) to the number average molecular weight ($M_n$).

The weight average molecular weight is given by $$M_w = \frac{\sum_i n_i M_i^2}{\sum_i n_i M_i}$$

the number average molecular weight is given by $$M_n = \frac{\sum_i n_i M_i}{\sum_i n_i}$$

the z-average molecular weight is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are determined by Gel Permeation Chromatography and proceed as follows:

Gel Permeation Chromatography. The distribution and the moments of molecular weight (Mw, Mn, Mw/Mn, etc.) were determined by using room temperature (20° C.) Gel Permeation Chromatography equipped using Tosoh EcoSEC HLC-8320GPC with enclosed Refractive Index (RI) Ultraviolet and (UV) detectors. Four Agilent PLgel of 5 µm 50 Ä; 5 µm 500 Ä; 5 µm 10E3 Ä; 5 µm Mixed-D were used in series. Aldrich reagent grade tetrahydrofuran (THF) was used as the mobile phase. The polymer mixture was filtered through a 0.45µ Teflon filter and degassed with an online degasser before entering the GPC instrument. The nominal flow rate was 1.0 mL/min and the nominal injection volume is 200 µL. The molecular weight analysis was performed with EcoSEC software.

The concentration (c), at each point in the chromatogram was calculated from the baseline-subtracted IR5 broadband signal intensity (I), using the following equation: c=βI, where "β" is the mass constant determined with polystyrene standards. The mass recovery was calculated from the ratio of the integrated area of the concentration chromatography over elution volume and the injection mass which is equal to the pre-determined concentration multiplied by injection loop volume.

Molecular Weight. The molecular weight was determined by using a polystyrene calibration relationship with the column calibration which is performed with a series of mono-dispersed polystyrene (PS) standards of 162, 370, 580, 935, 1860, 2980, 4900, 6940, 9960, 18340, 30230, 47190 & 66000 kg/mole. The molecular weight "M" at each elution volume is calculated with following equation:

$$\log M = \frac{\log(K_{PS}/K)}{a+1} + \frac{a_{PS}+1}{a+1}\log M_{PS}$$

Where the variables with subscript "PS" stand for polystyrene while those without a subscript correspond to the test samples. In this method aPS=0.67 and KPS=0.000175, "a" and "K" being calculated from a series of empirical formula (T. Sun, P. Brant, R. R. Chance, and W. W. Graessley, 34(19) MACROMOLECULES 6812-6820 (2001)). Specifically, a/K=0.695/0.000579 for polyethylene and 0.705/0.0002288 for polypropylene. All concentrations are expressed in g/cm3, molecular weight is expressed in g/mole, and intrinsic viscosity is expressed in dL/g unless otherwise noted.

The term "predominant compound" refers to a compound is predominant among the compounds of the same type in a composition. For example, the predominant compound is one that represents the greatest amount by weight among the compounds of the same type in a composition. Thus, for example, a predominant polymer is the polymer representing the greatest weight relative to the total weight of the polymers in the composition.

The term, "predominant unit" refers to a unit within the same compound (or polymer) that is predominant among the units forming the compound (or polymer) which represents the greatest fraction by weight among the units forming the compound (or polymer). For example, the hydrocarbon polymer modifier can comprise predominant units of cyclopentadiene where the cyclopentadiene units represent the greatest amount by weight among all the units comprising the modifier. Similarly, as described herein, the hydrocarbon polymer modifier can comprise predominant units selected from the group of cyclopentadiene, dicyclopentadiene, methylcyclopentadiene and the mixtures thereof where the sum of the units selected from the group of cyclopentadiene, dicyclopentadiene, methylcyclopentadiene and the mixtures thereof represents the greatest number by weight among all the units.

The term, a "predominant monomer" refers to a monomer which represents the greatest fraction by weight in the total polymer. Conversely, a "minor" monomer is a monomer which does not represent the greatest molar fraction in the polymer.

The phrase "composition based on" refers to a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, compositions described below can be different in the non-crosslinked state and in the crosslinked state.

As used herein, the term "elastomer" and "rubber" are used interchangeably and refer to an (one or more) elastomers resulting at least in part (i.e., a homopolymer or a copolymer) from diene monomers (monomers bearing two conjugated or non-conjugated carbon-carbon double bonds).

The terms the term "adhesive polymer component" and "adhesive base polymer" are used interchangeably.

"Diene elastomer" refers to an elastomer resulting at least in part (homopolymer or copolymer) from diene monomers (monomers bearing two double carbon-carbon bonds, whether conjugated or not). The diene elastomer can be "highly unsaturated," resulting from conjugated diene monomers, which have a greater than 50% molar content of units.

Diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and may especially be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

In the present disclosure, when reference is made to a ratio of the amounts of a compound A and of a compound B, or a ratio between the content of a compound A and the content of a compound B, this is always a ratio in the mathematical sense of the amount of compound A over the amount of compound B.

Unless expressly indicated otherwise, all the percentages (%) shown are percentages by weight ("wt. %"). Furthermore, any range of values denoted by the expression "between a and b" represents the range of values extending from more than a to less than b (that is to say, limits a and b excluded), while any range of values denoted by the expression "from a to b" means the range of values extending from a up to b (that is to say, including the strict limits a and b).

As used herein, the term, "cyclic component" refers to a distillation cut and/or synthetic mixture of $C_5$ and $C_6$ cyclic olefins, diolefins, dimers, codimers, and trimers. More specifically, cyclic components include, but are not limited to, cyclopentene, cyclopentadiene ("CPD"), dicyclopentadiene ("DCPD"), cyclohexene, 1,3-cycylohexadiene, 1,4-cyclohexadiene, methylcyclopentadiene ("MCPD"), di(methylcyclopentadiene) ("MCPD dimer"), and codimers of CPD and/or MCPD with $C_4$ cyclics such as butadienes, $C_5$ cyclics such as piperylene. An exemplary cyclic component is cyclopentadiene. Optionally, the cyclic components can be substituted. The dicyclopentadiene can be in either the endo or exo form.

Substituted cyclic components include cyclopentadienes and dicyclopentadienes substituted with a $C_1$ to $C_{40}$ linear, branched, or cyclic alkyl group. In an aspect the substituted cyclic component can have one or more methyl groups. In an aspect, the cyclic components are selected from the group of: cyclopentadiene, cyclopentadiene dimer, cyclopentadiene-$C_4$ codimer, cyclopentadiene-$C_5$ codimer, cyclopentadiene-methylcyclopentadiene codimer, methylcyclopentadiene-$C_4$ codimer, methylcyclopentadiene-$C_5$ codimer, methylcyclopentadiene dimer, cyclopentadiene and methylcyclopentadiene trimers and cotrimers, and/or mixtures thereof.

In an aspect, the hydrocarbon polymer modifier can further comprise an aromatic component. In an aspect, the aromatic component comprises one or more olefinic-aromatics represented by Formula I:

Formula I

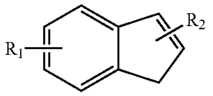

wherein $R_1$ and $R_2$ represent, independently of one another, a hydrogen atom, an alkyl group, alkenyl group, a cycloalkyl group, an aryl group or an arylalkyl group, for example, 1H-indene; 1-methyl-1H-indene; alkyl indene; 5-(2-methylbut-2-enyl)-1H-indene; 5,6,7,8-tetrahydro-1H-cyclopenta naphthalene; 4 indene 5 butan-lol etc. or derivatives thereof.

In an aspect, the aromatic component comprises one or more substituted benzene derivatives represented by Formula II Formula II

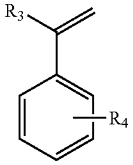

wherein $R_3$ and $R_4$ represent, independently of one another, a hydrogen atom, an alkyl group, alkenyl group, a cycloalkyl group, an aryl group or an arylalkyl group. Alpha-methylstyrene or substituted alpha-methylstyrenes having one or more substituents on the aromatic ring are suitable, particularly where the substituents are selected from alkyl, cycloalkyl, aryl, or combination radicals, each having one to eight carbon atoms per substituent. Non limiting examples include alpha-methylstyrene, alpha-methyl-4-butylstyrene, alpha-methyl-3,5-di-t-bensylstyrene, alpha-methyl-3,4,5-trimethylstyrene, alpha-methyl-4-bensylstyrene, alpha-methyl-4-chlorohexylstyrene, and/or mixtures thereof.

In an aspect, the hydrocarbon polymer modifier ("HPM") comprises an aromatic distillation cut from a petroleum refinery stream such as one obtained by steam cracking streams and then separating the fraction boiling in the range of 135° C. to 220° C. by fractional distillation. In an aspect, the aromatic distillation cut component comprises styrene, alkyl substituted derivatives of styrene, indene and/or alkyl substituted derivatives of indene. In an aspect, the aromatic distillation cut component comprises about 4 wt. % to about 7 wt. % of styrene; about 20 wt. % to about 30 wt. % of alkyl substituted derivatives of styrene, about 10 wt. % to about 25 wt. % indene, about 5 to about 10 wt. % alkyl substituted derivatives of indene and about 35 wt. % to about 45 wt. % non-reactive aromatics.

In an aspect, the olefin-aromatics, substituted benzene and/or aromatic distillation cut is between about 20 wt. % to about 75 wt. %, or about 25 wt. % to about 70 wt. % of the total weight of the HPM.

The present hydrocarbon polymer modifiers ("HPMs") can be prepared using different methodologies. For example, thermal polymerization of cyclic feed streams can be used in combination or absence of olefin-aromatics, substituted benzene and aromatic distillation cut. As described in the Examples below, different resins were prepared to achieve a desired molecular weight and softening point or glass transition temperature. Specifically, Tables 4 and 5 below describe the feed streams, polymerization conditions and final properties of the present HPMs.

Incompatibility with base polymers can limit the applications for resins having high Tg where low molecular weight and ease of processing is desirable. The present hydrocarbon polymer modifiers overcome this deficiency with the novel combination of the % H Ar and Mn, as well as preferably Tg and/or Mz, not previously described.

Specifically the present HPMs are defined as: Tg≥95−2.2*(% H Ar); Tg≥−53+(0.265*Mn), where Tg is glass transition temperature expressed in ° C. of the modifier, % H Ar represents the content of aromatic protons in the modifier, and Mn represents the number average molecular weight of the modifier. More specifically, the present HPMs are defined by an aromatic proton content ("% H Ar") of from 12 mole % to 19 mole %, and an Mn of from 300 g/mole to 450 g/mole.

In an aspect, the present HPMs have a transition glass temperature (Tg) of from 70° C. to 95° C., preferably from 70° C. to 90° C.

In an aspect, the present HPMs have a z-average molecular weight (Mz) of less than 1000 g/mole.

In an aspect, the hydrocarbon polymer modifiers have at least one and preferably all of the following additional features:

- a glass transition temperature (Tg) represented by Tg≥100−2.2*(H Ar),
- a glass transition temperature (Tg) represented by Tg≥−32+(0.265*Mn),
- a number average molecular weight (Mn) of from 350 g/mole to 420 g/mole.

Rubber Compositions

Further provided herein are rubber compositions comprising at least one elastomer, a reinforcing filler, a crosslinking system, and one or more of the present hydrocarbon polymer modifiers. In an aspect, the present rubber composition (also referred to as the "composition" or the "elastomer composition") comprises the present hydrocarbon polymer modifier having units selected from the group consisting of cyclopentadiene, dicyclopentadiene, methylcyclopentadiene and mixtures thereof. Also, as used in the rubber compositions, the present HPM further comprises a content of aromatic protons, expressed in percent, and a glass transition temperature Tg, expressed in ° C., such that Tg≥95−2.2*(% H Ar) and Tg≥−53+(0.265*Mn), and are further characterized by a % H Ar of from 12 to 19 mole percent (mole %) and an Mn from 300 g/mole to 450 g/mole, where % H Ar represents the content of aromatic protons of the HPM, Mn represents the number average molecular weight of the present HPM. Further, the HPM may be characterized by a Tg of from 70° C. to 95° C. and/or a z-average molecular weight (Mz) of less than 1000 g/mole. The content of the HPM in the rubber composition can be within a range extending from 15 phr to 150 phr, from 25 phr to 120 phr, from 40 phr to 115 phr, from 50 phr to 110 phr, and from 65 phr to 110 phr. Below 15 phr of the present HPM, the effect of the present HPM becomes insufficient and the rubber composition could have problems of grip. Above 150 phr, the composition could present manufacturing difficulties in terms of readily incorporating the present HPM into the composition.

The rubber compositions of the invention comprise a rubber composition based on at least an elastomer and a specific hydrocarbon polymer modifier as described above. The elastomer will be further described below.

As used herein, the terms "elastomer" and "rubber" are used interchangeably. They are well known by the person skilled in the art.

"Diene elastomer" refers to an elastomer resulting at least in part (homopolymer or copolymer) from diene monomers (monomers bearing two double carbon-carbon bonds, whether conjugated or not). The diene elastomer can be "highly unsaturated," resulting from conjugated diene monomers, which have a greater than 50% molar content of units.

Diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and may especially be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given the definitions provided above, diene elastomer refers to:

(a) any homopolymer obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidene norbornene or dicyclopentadiene;

(d) a copolymer of isobutene and of isoprene (butyl rubber) and also the halogenated versions, in particular chlorinated or brominated versions, of this type of copolymer.

Although it applies to any type of diene elastomer, essentially unsaturated diene elastomers, in particular of type (a) or (b) above can be useful in tire applications.

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers can have any microstructure, which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. “Function” here is preferentially understood to mean a chemical group which interacts with the reinforcing filler of the composition.

To summarize, the diene elastomer of the composition is preferentially selected from the group of highly unsaturated diene elastomers consisting of polybutadienes (abbreviated to “BRs”), synthetic polyisoprenes (IRs), natural rubber (NR), butadiene copolymers, isoprene copolymers and the mixtures of these elastomers. Such copolymers are more preferentially selected from the group consisting of butadiene/styrene (SBR) copolymers.

Thus, the invention preferably relates to compositions in which the elastomer said diene elastomer is selected from the group consisting of essentially unsaturated diene elastomers, and especially from the group consisting of polybutadienes, synthetic polyisoprenes, natural rubber, butadiene copolymers, isoprene copolymers and the mixtures of these elastomers.

According to a particularly preferred mode of the invention, the elastomer predominantly comprises an elastomer, preferentially a diene elastomer, having a glass transition temperature Tg of less than −40° C., preferably of between −40° C. and −110° C., more preferably between −60° C. and −110° C., more preferably between −80 and −110° C. and even more preferably between −90° C. and −110° C.

Preferably, the predominant diene elastomer is selected from the group consisting of polybutadienes, butadiene copolymers and mixtures of these elastomers, and more preferentially from the group consisting of polybutadienes, copolymers of butadiene and styrene, and the mixtures of these elastomers.

According to this embodiment, the predominant, preferentially diene, elastomer having a very low Tg is present in the composition at a content preferentially greater than or equal to 60 phr, more preferentially greater than or equal to 70 phr and more preferentially still greater than or equal to 80 phr. More preferably, the composition comprises 100 phr of elastomer having a very low Tg as defined above.

Reinforcing Filler

The composition can comprise a reinforcing filler. Use may be made of any type of reinforcing filler known for its abilities to reinforce a rubber composition, for example an organic filler, such as carbon black, a reinforcing inorganic filler, such as silica or alumina, or also a blend of these two types of filler.

As described herein, reinforcing filler can be selected from the group consisting of silicas, carbon blacks and the mixtures thereof.

The content of reinforcing filler can be within a range extending from 5 phr to 200 phr, and from 40 to 160 phr. In an aspect, reinforcing filler is silica, in an aspect, at a content within a range extending from 40 phr to 150 phr. The composition provided herein can comprise a minority amount of carbon black, where in an aspect, the content is within a range extending from 0.1 phr to 10 phr.

All carbon blacks are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

The present rubber compositions can comprise one type of silica or a blend of several silicas. The silica used can be any reinforcing silica, especially any precipitated or fumed silica exhibiting a BET surface area and a CTAB specific surface area both of less than 450 $m^2/g$, such as from 30 $m^2/g$ to 400 $m^2/g$. Mention will be made, as highly dispersible precipitated silicas (“HDSs”), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas “doped” with aluminium described in Application EP A-0735088, or the silicas with a high specific surface as described in Application WO 03/16837. The silica can have a BET specific surface of between 45 and 400 $m^2/g$, and between 60 and 300 $m^2/g$.

The present rubber compositions can optionally also comprise (in addition to the coupling agents) coupling activators, agents for covering the inorganic fillers and any other processing aid capable by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use can be made especially of silane polysulfides, referred to as “symmetrical” or “asymmetrical” depending on their specific structure, such as described, for example, in applications WO 03/002648 (or US 2005/016651) and WO 03/002649 (or US 2005/016650).

Also, suitable in particular, without the definition below being limiting, are silane polysulfides referred to as “symmetrical,” corresponding to the following general Formula III:

Z-A-Sx-A-Z, in which: (III)

x is an integer from 2 to 8 (such as from 2 to 5);

A is a divalent hydrocarbon radical (such as $C_1$-$C_{18}$ alkylene groups or $C_6$-$C_{12}$ arylene groups, more particularly $C_1$-$C_{10}$ alkylenes, in particular $C_1$-$C_4$ alkylenes, especially propylene);

Z corresponds to one of the formulae below:

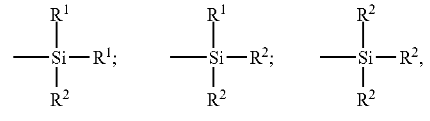

in which:

the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (as such $C_1$-$C_6$ alkyl, cyclohexyl or phenyl groups, in particular $C_1$-$C_4$ alkyl groups, more particularly methyl and/or ethyl), the $R^2$ radicals, which are substituted or unsubstituted and identical to or different from one another, represent a $C_1$-$C_{18}$ alkoxy or $C_5$-$C_{18}$ cycloalkoxy group (such as a group chosen from $C_1$-$C_8$ alkoxys and $C_5$-$C_8$ cycloalkoxys, such as a group chosen from $C_1$-$C_4$ alkoxys, in particular methoxy and ethoxy).

In the case of a mixture of alkoxysilane polysulfides corresponding to the above Formula (III), especially normal commercially available mixtures, the mean value of the "x" indices is a fractional number such as between 2 and 5, of approximately 4. However, advantageously, the mixture can be carried out with alkoxysilane disulfides (x=2). Examples include silane polysulfides of bis(($C_1$-$C_4$)alkoxy($C_1$-$C_4$)alkylsilyl($C_1$-$C_4$)alkyl) polysulfides (especially disulfides, trisulfides or tetrasulfides), such as, for example, bis(3-trimethoxysilylpropyl) or bis(3-triethoxysilylpropyl) polysulfides. Use can be made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Other examples include bis(mono($C_1$-$C_4$)alkoxyldi($C_1$-$C_4$)alkylsilylpropyl) polysulfides (in particular disulfides, trisulfides or tetrasulfides), more particularly bis(monoethoxydimethylsilylpropyl) tetrasulfide, such as described in Patent Application WO 02/083782 (or US 2004/132880). Mention will also be made, as coupling agent other than alkoxysilane polysulfide, of bifunctional POSs (polyorganosiloxanes) or else of hydroxysilane polysulfides ($R^2$=OH in the above formula III), such as described in published patent applications WO 02/30939 (or U.S. Pat. No. 6,774,255) and WO 02/31041 (or US 2004/051210), or else of silanes or POSs bearing azodicarbonyl functional groups, such as described, for example, in published patent applications WO 2006/125532, WO 2006/125533 and WO 2006/125534.

The content of coupling agent in the present compositions can be between 1 phr to 15 phr, and between 3 phr to 14 phr.

In addition, filler can be made of a reinforcing filler of another nature, especially organic, provided that this reinforcing filler is covered with a layer of silica or else comprises functional sites, especially hydroxyl sites, at its surface which require the use of a coupling agent in order to form the bond between the filler and the elastomer.

The physical state in which the reinforcing filler is provided is not important, whether it is in the form of a powder, micropearl, granule, bead and/or any other appropriate densified form.

Crosslinking Systems

In the rubber compositions provided herein, any type of crosslinking system for rubber compositions can be used.

The crosslinking system can be a vulcanization system, that is to say based on sulfur (or on a sulfur-donating agent) and a primary vulcanization accelerator. Various known secondary vulcanization accelerators or vulcanization activators, such as zinc oxide, stearic acid or equivalent compounds, or guanidine derivatives (in particular diphenylguanidine), may be added to this base vulcanization system, being incorporated during the first non-productive phase and/or during the productive phase, as described subsequently.

Sulfur can be used at a content of between 0.5 phr and 10 phr, between 0.5 phr and 5 phr, in particular between 0.5 and 3 phr.

The vulcanization system of the composition also can comprise one or more additional accelerators, for example compounds of the family of the thiurams, zinc dithiocarbamate derivatives, sulfenamides, guanidines or thiophosphates. Use may in particular be made of any compound capable of acting as accelerator of the vulcanization of diene elastomers in the presence of sulfur, especially accelerators of thiazoles type and also their derivatives, accelerators of the thiurams type, and zinc dithiocarbamates. These accelerators are selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSP"), zinc dibenzyldithiocarbamate (abbreviated to "ZBEC") and the mixtures of these compounds. Use is made of a primary accelerator of the sulfenamide type.

The rubber compositions can optionally comprise all or a portion of the normal additives customarily used in elastomer compositions intended especially for the manufacture of treads, such as, for example, pigments, protective agents, such as antiozone waxes, chemical antiozonants or antioxidants, plasticizing agents other than those described above, anti-fatigue agents, reinforcing resins, or methylene acceptors (for example novolac phenolic resin) or donors (for example HMT or H3M).

The rubber compositions can also comprise a plasticizing system. This plasticizing system may be composed of a hydrocarbon-based resin with a Tg of greater than 20° C., in addition to the specific hydrocarbon-based resin described above, and/or a plasticizing oil.

Of course, the compositions can be used alone or in a blend (i.e., in a mixture) with any other rubber composition which can be used in the manufacture of tires.

The rubber compositions described herein can be both in the "uncured" or non-crosslinked state (i.e., before curing) and in the "cured" or crosslinked, or else vulcanized, state (i.e., after crosslinking or vulcanization).

Preparation of the Rubber Compositions

The rubber compositions are manufactured in appropriate mixers, using two successive phases of preparation: a first phase of thermomechanical working or kneading (sometimes referred to as "non-productive" phase) at high temperature, up to a maximum temperature of between 110° C. and 200° C., for example between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in applications EP-A-0 501 227, EP-A-0 735 088, EP-A-0 810 258, WO 00/05300 or WO 00/05301.

The first (non-productive) phase is carried out in several thermomechanical stages. During a first step, the elastomers, the reinforcing fillers and the hydrocarbon polymer modifiers (and optionally the coupling agents and/or other ingredients, with the exception of the crosslinking system) are introduced into an appropriate mixer, such as a customary internal mixer, at a temperature between 20° C. and 100° C. and between 25° C. and 100° C. After a few minutes, from 0.5 to 2 min, and a rise in the temperature to 90° C. or to 100° C., the other ingredients (that is to say, those which remain, if not all were put in at the start) are added all at once or in portions, with the exception of the crosslinking system, during a mixing ranging from 20 seconds to a few minutes. The total duration of the kneading, in this non-productive phase, is between 2 and 10 minutes at a temperature of less than or equal to 180° C. and less than or equal to 170° C.

After cooling the mixture thus obtained, the crosslinking system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or slab, in particular for laboratory characterization, or else extruded, in order to form, for example, a rubber profiled element used in the manufacture of semi-finished products for tires. These products may then be used for the manufacture of tires, with the advantage of having good tack of the layers on one another before curing of the tire.

The crosslinking (or curing) can be carried out at a temperature generally of between 130° C. and 200° C., under pressure, for a sufficient time which can vary, for example, between 5 and 90 min, as a function in particular of the curing temperature, of the crosslinking system adopted, of the kinetics of crosslinking of the composition under consideration or else of the size of the tire.

Adhesive Composition

One or more of the HPMs described herein can be used as a tackifier resin (also referred to herein as a tackifier and/or a tackifying agent) in an adhesive composition. The adhesive composition can be a hot melt adhesive composition selected from the group of hot melt pressure sensitive adhesive, hot melt packaging adhesives and hot melt nonwoven adhesives. Table 9 below summarizes the ranges for the major components of exemplary adhesive compositions described herein.

As shown in Table 9 of Example 4 below, the present hot melt adhesive compositions formulated can comprise one or more adhesive base polymers in combination with a tackifying agent. The amount of base polymer and tackifying agent can vary depending on the specific type of adhesive formulation. The adhesive composition can comprise at least about 15 percent, not more than about 90 percent, by weight, of one or more adhesive base polymers, based on the total weight of the adhesive composition.

Examples of suitable adhesive base polymers (also referred to as elastomers or adhesive polymer components) can include, but are not limited to, natural rubber (NR); styrene butadiene rubber (SBR); butadiene rubber (BR); nitrile rubber (NR); butyl rubber; isobutylene polymers; isobutylene copolymers; styrenic block copolymers (SBC), such as, styrene-isoprene-styrene (SIS) copolymers, styrene-butadiene-styrene (SBS) copolymers, styrene-isoprene-butadiene-styrene (SIBS), styrene-ethylene-butylene-styrene (SEBS) copolymers, styrene-ethylene-propylene-styrene (SEPS) copolymers, styrene-butadiene-butylene-styrene (SBBS) copolymers, styrene-ethylene-ethylene-propylene-styrene (SEEPS), styrene-ethylene-propylene (SEP) copolymers, and combinations thereof; polyethylene polymers; polypropylene polymers; polyethylene copolymers; polypropylene copolymers; metallocene copolymers including polyethylene, polypropylene, and/or polyolefins; amorphous polyalphaolefins (APAO); olefinic polymers and olefinic block copolymers (OBC); ethyl vinyl acetate (EVA); acrylic polymers; acrylic copolymers; acrylic block copolymers (ABCs); polyamide; polyurethanes; epoxies; polyesters; functional polymers (e.g. of functionality include maleic, silane, phenolic etc.); and combinations of one or more of the above-listed polymers.

Examples of commercially available base polymers can include, but are not limited to, those sold under the trade names Kraton (available from Kraton, Houston, TX), Vector (available from TSRC-Dexco, Houston, TX), ENGAGE, DOWLEX, AFFINITY, AFFINITY GA, INFUSE, and VERSIFY (available from Dow Chemical Company, Midland, Mich.); EXCEED, ENABLE, EXCEED XP, ESCORENE, ACHIEVE, EXACT, VISTAMAXX (available from Exxon Chemical Company, Irving, Tex.); EASTOFLEX, AERAFIN (available for Eastman Chemical, Kingsport, TN) VESTOPLAST (available from Evonik, Essen, Germany); REXTAC (available from Rextac, Odessa, Tex.); L-MODU (available from Idemitsu, Japan); Tafiner ((available from Mitsui, Japan).

The present HPM can be used at least about 1 percent, and/or not more than about 99 percent, by weight, of the total finished article composition. Finished articles can be any adhesives, adhesives materials, any sealants, any sealant materials, any films, any films materials, any molded material, any thermoformed material, any carpet, any carpet material, any extruded material, any master batch, any master batch material, any color concentrate, any color concentrate material, any shoe sole material, any rigid packaging material, any flexible packaging material, any electronics component, any automotive component and, not limited to any automotive material. Finished articles within the scope of this disclosure do not include those relating to or used in pneumatic and non-pneumatic tires and wheels.

When present, the one or more HPMs can be selected from the group of hydrocarbon resins derived from cycloaliphatic feeds (such as, for example, cyclopentadiene, dicyclopentadiene), linier aliphatic feeds (such as, for example piperylene, isoprene, isoamylene), aromatic feeds (such as, for example styrene, indene, vinyl toluene), hydrocarbon resins derived from combination of cycloaliphatic feeds, linear aliphatic feeds and aromatic feeds, aromatically-modified cycloaliphatic resins, C5 hydrocarbon resins, C5/C9 hydrocarbon resins, aromatically-modified C5 hydrocarbon resins, C9 hydrocarbon resins, styrene resins, styrene/alpha-methyl styrene copolymer resins, styrene/vinyl toluene copolymer resins, styrene/para-methyl styrene copolymer resins, styrene/indene copolymer resins, styrene/methyl indene copolymer resins, styrene/C5 copolymer resins, styrene/C9 copolymer resins, terpene resins, terpene phenolic resins, terpene/styrene resins, rosins, esters of rosins, esters of modified rosins, modified rosins, liquid resins, fully or partially hydrogenated rosins, fully or partially hydrogenated rosin esters, fully or partially hydrogenated modified rosins/rosin esters, fully or partially hydrogenated rosin alcohols, fully or partially hydrogenated C5 resins, fully or partially hydrogenated C5/C9 resins, fully or partially hydrogenated cycloaliphatic resins, fully or partially hydrogenated cycloaliphatic/C9 resins, fully or partially hydrogenated C5/cycloaliphatic/C9 resins, fully or partially hydrogenated aromatically-modified C5 resins, fully or partially hydrogenated C9 resins, fully or partially hydrogenated styrene resins, fully or partially hydrogenated styrene/alpha-methyl styrene copolymer resins, fully or partially hydrogenated styrene/vinyl toluene copolymer resins, fully or partially hydrogenated styrene/para-methyl styrene copolymer resins, fully or partially hydrogenated styrene/indene copolymer resins, fully or partially hydrogenated styrene/methyl indene copolymer resins, fully or partially hydrogenated styrene/C5 copolymer resins, fully or partially hydrogenated styrene/C9 copolymer resins, fully or partially hydrogenated C5/cycloaliphatic resins, fully or partially hydrogenated C5/cycloaliphatic/styrene/C9 resins, fully or partially hydrogenated cycloaliphatic resins, fully or partially hydrogenated aromatically modified cycloaliphatic resins, and combinations thereof.

In addition to the adhesive base polymer or polymers and the present tackifying agent, formulated adhesive compositions can comprise one or more additional modifiers, including, for example, oils, waxes, antioxidants, plasticizers, fillers, end block modifiers, end block modifiers/polymer reinforcing agents, crosslinking agents, nucleating agents, clarifiers, master batches, color concentrates, odor masking agents, rheology modifiers, thickeners, and combinations thereof. The types and amounts of the additional modifiers can vary, based on the specific type of adhesive composition being formulated. For example, the adhesive composition comprises a hot melt packaging adhesive, the composition can comprise a wax in an amount of at least about 1 percent, and/or not more than about 70 percent, by weight of the total adhesive composition. Examples of suitable waxes can include, but are not limited to, microcrystalline waxes; metallocene-catalyzed waxes, including polyethylene (mPE) and polypropylene (mPP) waxes; paraffin waxes; Fischer-Tropsch waxes; vegetable waxes; highly-branched, functional (such as, for example, maleated), low molecular weight waxes derived from petroleum; solid oils; and combinations thereof.

The adhesive composition can be a hot melt pressure sensitive adhesive or a hot melt nonwoven adhesive. The adhesive can include one or more oils in an amount of at least about 1 percent, and/or not more than about 50 percent, by weight of the total adhesive composition. Examples of suitable oils include, but are not limited to, naphthenic oil, paraffinic oil, hydrotreated oils, mineral oils, white oils, aromatic oils, triglyceride oils, and combinations thereof. In addition, the adhesive composition can include one or more extender oils, such as, for example, liquid paraffin, castor oil, rape seed oil, mineral oil, and combinations thereof.

In addition to waxes and/or oils, the adhesive composition can comprise one or more antioxidants (e.g. phenolic and/or phosphite type), plasticizers (e.g., dibutyl phthalate, dioctyl phthalate, non-phthalate plasticizers, benzoate plasticizers, and/or chlorinated paraffins), fillers (e.g., carbon black, calcium carbonate, titanium oxide, and/or zinc oxide), end block modifiers/polymer reinforcing agents, crosslinkers, and combinations thereof, as well as any other additive that would render the final formulation suitable for a particular application.

In an aspect, one or more HPMs described above can be added to a polymeric system including at least one polymer material to thereby improve the stability, rheology, processability, barrier properties, cling properties, adhesion properties, clarity, haze, softness, shrinkage, foaming characteristics, mechanical properties, and/or thermal properties of the resulting polymer system.

As described more fully below, adhesive compositions comprising one or more of the present HPMs can be prepared using any suitable method (any batch mixing and/or continuous mixing techniques; vertical mixing and/or horizontal mixing techniques). For example, the components of the adhesive composition can be combined in a Sigma blade mixer, a plasticorder, a Brabender mixer, a twin-screw extruder, or via an in-can blend (pint-cans). The resulting adhesive mixture can then be shaped into a desired form by an appropriate technique including, for example, extrusion, compression molding, calendaring or roll coating techniques (e.g., gravure, reverse rolling, etc.). The adhesive can also be applied to an appropriate substrate via curtain coating or slot-die coating or sprayed through a suitable nozzle (for e.g. configuration at an appropriate speed with conventional nonwoven application equipment).

The adhesive composition as described herein may be applied to a substrate by melting the blended composition and applying a suitable amount (e.g., from 0.02 to 100 mils) of adhesive blend to a desired substrate (e.g., textile fabric, paper, corrugated glass, plastic, films, nonwovens, and/or metal) to thereby form an adhesive article. Examples of adhesive articles constructed from adhesive compositions include, but are not limited to, tapes such as packaging tape, duct tape, masking tape, invisible tape, electrical tape, gaffer tape, hockey tape, and other specialty tapes; labels such as paper labels, beverage labels, smart labels, consumer electronic labels, pharmaceutical labels, labels for graphic arts, and the like; packaging applications including case sealing, carton sealing, book binders, flexible packaging adhesives, flexible packaging interlayer adhesives; corrugated box adhesives, folding carton adhesives, glue sticks, and the like; and nonwoven applications including diaper construction adhesives, diaper elastic attachment adhesives, stretch films, feminine hygiene article adhesives (napkin adhesives), adult incontinence product adhesives, disposable bed, mattress adhesives or pet pad adhesives, small nonwoven laminates, and the like; automotive adhesives; construction adhesives; engineering adhesives and the like. Adhesives can be solvent based, water based, hotmelt, reactive, one-part adhesives, two-part adhesives, moisture curable, UV/EB curable, cross-linkable, thermoplastic and/or thermoset adhesives.

In addition to adhesive compositions, the present HPM and/or combination of HPMs, including nonhydrogenated, partially hydrogenated and/or fully hydrogenated HPM, may be useful in other applications. For example, the present hydrocarbon polymer modifier can be used in rubber compositions utilized in one or more components of a tire, (such as, for example, tire treads and/or sidewalls, carcass), one or more components of a belt, one or more components of a hose. One or more of hydrocarbon polymer modifiers can be used plastic modification (such as, for example, films; rigid packaging articles such as jugs, bottles, containers and/or flat articles) to improve the mechanical properties (such as, stiffness, toughness, tensile strength, modulus and the like), barrier properties (such as, for example oxygen transmission rate, water/moisture vapor transmission rate and the like), clarity, adhesion, and/or shrinkage. One or more of the hydrocarbon polymer modifiers, as described herein, can be used as a replacement for various types of oil typically utilized in rubber compositions, and/or plastic modification to improve the processability of the rubber/plastic composition and/or to improve the miscibility of different polymer systems, and/or to impart immiscibility in different polymer systems, and/or to improve the ultimate performance and/or mechanical properties (such as, for example, modulus of elasticity, rolling resistance, wet grip, tensile strength, wear and the like). Furthermore, other applications or uses of the hydrocarbon polymer modifiers disclosed herein are contemplated as falling within the scope of the present disclosure.

Hotmelt Packaging Applications

The adhesive compositions disclosed herein can be used in various packaging articles. The packaging article may be useful as a carton, container, crate, case, corrugated case, or tray, for example. More particularly, the packaging article may be useful as a cereal product, cracker product, beer packaging, frozen food product, paper bag, drinking cup, milk carton, juice carton, drinking cup, or as a container for shipping produce. The packaging article is formed by applying an adhesive composition to at least a portion of one or more packaging elements. The packaging elements may be formed from paper, paperboard, containerboard, tagboard, corrugated board, chipboard, kraft, cardboard, fiberboard, plastic resin, metal, metal alloys, foil, film, plastic film, laminates, sheeting, or any combination thereof. In one aspect, the adhesive composition may be used to bind or bond two or more packaging elements together wherein the packaging elements are formed from the same or different type of materials. Accordingly, the packaging elements may be individually formed from paper, paperboard, containerboard, tagboard, corrugated board, chipboard, kraft, cardboard, fiberboard, plastic resin, metal, metal alloys, foil, film, plastic film, laminates, sheeting, or any combination thereof.

The one or more packaging elements may also be individually coated using paper, foil, metal, metal alloys, polyethylene, polypropylene, polyester, polyethylene terephthalate, polyvinyl chloride, polyvinylidine chloride, polyvinyl acetate, polyamides, homopolymers thereof, and combinations and copolymers thereof. The adhesive formulations disclosed herein can be used in various woodworking applications including, but not limited to furniture, toys, musical instruments, window frames and sills, doors, flooring, fencing, tools, ladders, sporting goods, dog houses, gazebos/decks, picnic tables, playground structures, planters, scaffolding planks, kitchen utensils, coffins, church pews/altars, and canes. The adhesive formulations described herein, having a high polymer load, provide a desired combination of physical properties such as stable adhesion over time, indicative of broad application temperature ranges, and a long open time and therefore can be used in a variety of woodworking applications disclosed herein. It should be appreciated that the adhesive formulations of the present disclosure, while being well suited for use in woodworking products, may also find utility in other applications as well. In an aspect, a woodworking process to prepare the woodworking application involves forming a woodworking article by applying an adhesive composition to at least a portion of a structural element. The structural element can include a variety of materials, which include, but are not limited to wood or plywood, or plastic or veneer. For example, the structural element can also include lumber, wood, fiberboard, plasterboard, gypsum, wallboard, plywood, PVC, melamine, polyester, impregnated paper and sheetrock. A woodworking process can be used to form indoor furniture, outdoor furniture trim, molding, doors, sashes, windows, millwork and cabinetry, for example. As described below, Example 3 shows the packaging adhesive compositions and evaluation results using the present HPMs.

The features of the present HPMs and compositions containing the HPM are demonstrated in the following non-limiting examples. Test methods and experimental procedures used in the examples are described immediately below.

DSC Measurements. The following DSC procedure was used to determine the glass transition temperatures (Tg) of HPM. Approximately 6 mg of material was placed in a microliter aluminum sample pan. The sample was placed in a differential scanning calorimeter (Perkin Elmer or TA Instrument Thermal Analysis System) and was heated from 23° C. to 200° C. at 10° C./minute and held at 200° C. for 3 minutes. Afterward, the sample was cooled down to −50° C. at 10° C./minute. The sample was held at −50° C. for 3 minutes and then heated from −50° C. to 200° C. at 10° C./minute for a second heating cycle. The Tg was determined in the TA Universal Analysis on the second heating cycle using inflection method. The "Glass Transition" menu item on the TA Universal Analysis equipment is used to calculate the onset, end, inflection, and signal change of Tg in the DSC. The program enables the determination of the onset, which is the intersection of the first and second tangents, where the inflection is the portion of the curve between the first and third tangents with the steepest slope, and the end is the intersection of the second and third tangents. The Tg of the HPM is the inflection temperature of the curve.

% H Ar. 500 MHz NMR instrument in TCE-d2(1,2 dichloroethane) or CDCl3 (chloroform) solvent at 25° C. and 120 scans. NMR data of the HPM were measured by dissolving 20±1 mg of sample in 0.7 ml of d-solvents. The samples are dissolved in TCE-d2/CDCl3 in 5 mm NMR tube at 25° C. until the sample was dissolved. There is no standard used. The TCE-d2/CDCl3 presents as a peak at 5.98 or 7.24 ppm and used as the reference peak for the samples. The $^{1}$H NMR signals of the aromatic protons are located between 8.5 ppm and 6.2 ppm. The ethylenic protons give rise to signals between 6.2 ppm and 4.5 ppm. Finally, the signals corresponding to aliphatic protons are located between 4.5 ppm and 0 ppm. The areas of each category of protons are related to the sum of these areas to thereby give a distribution in terms of % of area for each category of protons.

Softening Point. "Softening Point" is the temperature, measured in ° C., at which a material will flow, as determined according to the Ring & Ball Method, as measured by ASTM E-28. As a rule of thumb, the relationship between Tg and softening point is approximately: Tg=softening point−50° C.

Mn, Mz and MWD are measured as described above.

Dynamic Properties (after Curing)

The dynamic properties G* and tan(δ)max are measured on a viscosity analyzer (Metravib V A4000) according to Standard ASTM D 5992-96. The response of a sample of vulcanized composition (cylindrical test specimen with a thickness of 4 mm and a diameter of 10 mm), subjected to a simple alternating sinusoidal shear stress, at a frequency of 10 Hz, under temperature condition (23° C.) according to Standard ASTM D 1349-99, or at a different temperature. A deformation sweep is performed from 0.1% to 50% (forward cycle), then from 50% to 0.1% (return cycle). For the return cycle, the value of rigidity at 10% deformation is then noted.

The higher the value of rigidity at 10% deformation and 23° C., the more the composition will provide good road handling. The results are expressed in terms of performance base 100, that is to say that the value 100 is arbitrarily assigned to the control, in order to subsequently compare the G*10% at 23° C. (that is to say the rigidity and hence the road handling) of the various solutions tested. The value in base 100 is calculated according to the operation (value of G*10% at 23° C. of the sample/value of G*10% at 23° C. of the control)*100. Therefore, a higher value represents an improvement of the road handling performance, while a lower value represents a reduction in the road handling performance.

The higher the value of rigidity at 10% deformation and 40° C., the more the composition will provide good road handling. The results are expressed in terms of performance base 100, that is to say that the value 100 is arbitrarily assigned to the control, in order to subsequently compare the G*10% at 40° C. (that is to say the rigidity and hence the road handling) of the various solutions tested. The value in base 100 is calculated according to the operation (value of G*10% at 40° C. of the sample/value of G*10% at 40° C. of the control)*100. Therefore, a higher value represents an improvement of the road handling performance, while a lower value represents a reduction in the road handling performance.

Viscosity. Viscosity of the pressure sensitive adhesive blend was measured using Brookfield viscometer either at about 150° C. or about 177° C. as noted. Viscoelastic characteristics (Rheology) of the adhesives blends were analyzed using an Anton Parr Rheometer in a parallel plate geometry at 0.1% strain, frequency was 10 rad/see and the heating rate was 2° C./min.

Peel Adhesion/Loop Tack/Hold Power. Selected pressure sensitive adhesive blends were coated on to a 2 mil PET film using a Cheminstruments HLCL-1000 coater at 177° C. and laminated on to a silicon liner. Peel adhesion (90 degree peel) was tested according to PSTC-101 F (ASTM D3330F) method using a Cheminstruments AR-1000 adhesion release tester. Tack (Loop tack) was tested according to PSTC-16 method B (ASTM D6195B) using a Cheminstruments LT-1000 loop tack tester. Hold Power/Static Shear was tested according to modified PSTC-107A (ASTM D 3654A) method using Cheminstruments RT-30 shear tester.

Fiber tear. Fiber tear describes the bond strength of the adhesive to the substrate and is measured at room temperature ("RT"), 2° C., and −18° C. As used herein, the term "room temperature" is used to refer to the temperature range of about 20° C. to about 25° C. Fiber tear is a visual measurement as to the amount of paper substrate fibers that are attached to a bond after the substrates are torn apart. 100% fiber tear means the adhesive is stronger than the substrate and 100% of the adhesive is covered in substrate fibers. Fiber tear is determined by bonding together substrates with the adhesive. A drop of molten adhesive (150° C. to 180° C.) is positioned on one of the substrates. The second substrate is placed on top of the adhesive, and a 500 g weight is placed on top of the second substrate for even application. The adhesive is cooled at the referenced temperature for at least one hour. The substrates are then torn apart and the adhesive is inspected for fiber tear.

Set Time. Set time is the minimum time interval, after bonding two substrates, during which the cohesive strength of the bond becomes stronger than joint stress. It represents the time necessary to cool down an adhesive composition and obtain a good bond. Set time is determined by bonding together substrates with the adhesive after the molten adhesive (150° C. to 180° C.) has been dropped onto one of the substrates with an eye dropper. The second substrate is placed on top of the adhesive, and a 500 g weight is placed on top of the second substrate for even application. After a predetermined interval of time, the second substrate is removed and checked for fiber tear. If no fiber tear is found, a longer interval of time is tried. This is continued until fiber tear is found. This length of time is reported as the set time in seconds.

Peel Adhesion Failure Temperature ("PAFT"). PAFT refers to the temperature at which the adhesive bond of the composition fails. PAFT of a hot melt adhesive composition is tested according to the standard PAFT test based on ASTM D-4498. PAFT is a critical factor for storing boxes in environments above ambient temperature, such as warehouses. PAFT is measured in degree c. ("° C."). Each adhesive was subjected to a shear adhesion failure test (SAFT), based on ASTM D-4498 as well.

The following examples are intended to highlight various aspects of certain aspect of the present invention. It should be understood, however, that these examples are included merely for purposes of illustration and are not intended to limit the scope of the invention, unless otherwise specifically indicated.

Example 1

Analysis of Prior Art Hydrocarbon Polymer Additives

Prior art resins with at least one elastomer and a prior art hydrocarbon polymer additive were evaluated for Tg and % H Ar. The first set of prior art additive samples (PA1, PA2, PA3, PA4 and PA5) each had: (a) dicyclopentadiene, cyclopentadiene, and methylcyclopentadiene derived content of about 40 wt. % to about 80 wt. % of the total weight of the hydrocarbon polymer additive: (b) a weight average molecular weight of about 100 g/mole to about 800 g/mole; and (c) a softening point of about 110° C. to about 150° C. as determined in accordance with ASTM D6090. These dicyclopentadiene resins further included aromatics such as styrene, xylene, alpha-methyl styrene, vinyl toluene and indene and non-aromatics such as linear C4 to C6 fractions or its isomers. The dicyclopentadiene based additive and an elastomer combination were shown to improve performance properties in tires such as high wet traction and low rolling resistance applications.

The hydrocarbon polymer additives used in these elastomeric compositions had the characteristics as shown in the Table 1.

TABLE 1

Prior Art Hydrocarbon Polymer Additives -Set 1

| Sample | Softening Point (° C.) | % H Ar | Tg (° C.) |
|---|---|---|---|
| PA 1 | 89 | 10 | 40 |
| PA 2 | 103 | 0 | 52 |
| PA 3 | 118 | 0 | 66 |
| PA 4 | 140 | 0 | 86 |
| PA 5 | 103 | 10 | 52 |

The characteristics provided in Table 1 were obtained from US 2015/0065655 and the glass transition was obtained from literature.

In a second set of prior art samples (PA6, PA7, PA8, PA9 and PA10), thermally polymerized resins produced from a feedstock comprising a vinyl aromatic component as the predominant component, a cyclodiene component, and optionally an acyclic diene component were considered. The vinyl aromatic stream was taught to comprise styrene, alkyl substituted derivatives of styrene, indene and alkyl substituted derivatives of indene. The cyclodiene component comprised monomers, dimers and codimers of cyclopentadiene and alkyl substituted derivatives of cyclopentadiene. Acyclic diene component comprises C4-C6 olefins and diolefins. The resins were produced by thermally polymerizing the above feedstock at 275° C. preferably for 2 to 3 hours. The resultant resin had moderate softening point but very broad molecular weight distribution. The resin glass transition temperature (Tg) and % aromaticity (% H Ar) of these prior art ("PA") additives had properties as shown in Table 2.

TABLE 2

Prior Art Hydrocarbon Polymer Additives -Set 2

| Sample | Softening Point (° C.) | % H Ar | Tg (° C.) |
|---|---|---|---|
| PA 6 | 102 | 10 | 53 |
| PA 7 | 103 | 12 | 52 |
| PA 8 | 105 | 3 | 51 |
| PA 9 | 103 | 8 | 58 |
| PA 10 | 109 | 11 | 52 |

In a third set of prior art samples (PA11, PA12, PA13 and PA14), hydrocarbon polymer modifiers having a piperylene component, an aromatic component and a cyclic pentadiene component were studied. The cyclic pentadiene component comprised a dicyclopentadiene fraction and a dimethylcyclopentadiene fraction with a number average molecular weight ($M_n$) greater than 400 and a z-average molecular weight ($M_z$) less than 15000 g/mole containing at least 8% H Ar. The resin properties reported are provided in Table 3.

TABLE 3

| Prior Art Hydrocarbon Polymer Additives -Set 3 | | | |
|---|---|---|---|
| Sample | Softening Point (° C.) | % H Ar | Tg (° C.) |
| PA 11 | 85.1 | 13.1 | 35 |
| PA 12 | 89.2 | 13.0 | 49 |
| PA 13 | 91.4 | 13.7 | 41 |
| PA 14 | 93.4 | 15.9 | 43 |

With respect to processes for making prior art additives, hydrocarbon polymer additives have been prepared by thermally polymerizing a mixture consisting essentially of about 5% to 25% by weight styrene or aliphatic or aromatic substituted styrene and about 95% to 75% by weight based on total monomer content of cyclic diolefin component comprising at least about 50% by weight dicyclopentadiene. See e.g., U.S. Pat. No. 6,825,291. This procedure of sequential monomer addition has been used to control the molecular weight of the hydrocarbon resin. Not only is this process cumbersome, but can result in broad polydispersity of the hydrocarbon resin.

Table 4 summarizes additional commercial resins that have been used in the prior art and are used in the comparative examples below.

TABLE 4

| Sample | Reference | Mn (g/mol) | Mz (g/mol) | Tg (° C.) | % HA (%) |
|---|---|---|---|---|---|
| 1 | Escorez 5615 | 509 | 1400 | 68 | 10% |
| 2 | Escorez 5600 | 484 | 1450 | 51 | 10% |
| 3 | Escorez 5400 | 400 | 1750 | 50 | 0% |
| 4 | Escorez 5637 | 510 | 1670 | 80 | 5% |

Previously described rubber compositions containing hydrocarbon-based resin predominantly comprised units of cyclopentadiene, dicyclopentadiene, methylcyclopentadiene and mixtures thereof. Further, as taught, these hydrocarbon resins had a Z-average molecular weight (Mz) of less than 2000 g/mol and Tg expressed in ° C. such that Tg≥80−2*(% HA) where % HA represented the content of aromatic protons of the resin. In developing these compositions, the focus of the problem and solution was on improving adhesion as well as the rolling resistance of elastomeric compositions. Moreover, the rigidity (Dynamic Properties G*) at low temperature was measured at low strain sweep.

Example 2

Analysis of the Present HPM

HPM Sample Nos. B, C, D, E, G and H were prepared by varying the feed streams in a thermal polymerization unit known to achieve a certain tackifier softening point or Tg and molecular weight. After processing in the thermal polymerization unit, the tackifiers were nitrogen-stripped at 200° C. The properties of the hydrocarbon polymer modifiers are provided in the Tables 5A, 5B, 6A and 6B below. The modifiers described herein can be produced by known methods. See e.g., the Kirk-Othmer Encyclopedia of Chemical Technology, 4th ed., Vol. 13, pp. 717-744. One method is to thermally polymerize petroleum fractions. Polymerization can be batch, semi-batch or continuous. Thermal polymerization is often carried out at a temperature between 160° C. and 320° C., for example, at about 260° C.-280° C., for a period of 0.5 to 9 hours, and often 1.0 to 4 hours. Thermal polymerization is usually carried out in presence or absence of inert solvent.

The inert solvent can have a boiling point range from 60° C. to 260° C. and can be selected from isopropanol, toluene, heptane, Exxsol™ or Varsol™ or base White spirit from 2 wt. % to 50 wt. %. Solvents can be used individually or in combinations thereof.

The HPM produced can be optionally dissolved in an inert, de-aromatized or non-de-aromatized hydrocarbon solvent such as Exxsol™ or Varsol™ or base White spirit in proportions varying from 10% to 60% and for example in the region of 30% by weight polymer. Hydrogenation is then conducted in a fixed-bed, continuous reactor with the feed flow either in an up flow or downflow liquid phase, or trickle bed operation.

Hydrogenation treating conditions generally include reactions ranging in temperature of from about 100° C. to about 350° C., from about 150° C. to about 300° C., and from about 160° C. to about 270° C. The hydrogen pressure within the reactor should not exceed more than 2000 psi, for example, no more than 1500 psi, and/or no more than 1000 psi. The hydrogenation pressure is a function of the hydrogen purity and the overall reaction pressure should be higher if the hydrogen contains impurities to give the desired hydrogen pressure. Typically, the optimal pressure used is between about 750 psi and 1500 psi, and/or between about 800 psi and about 1000 psi. The hydrogen to feed volume ratio to the reactor under standard conditions (25° C., 1 atm pressure) typically can range from about 20 to about 200. Further exemplary methods for preparing the HPMs described herein are generally found in U.S. Pat. No. 6,433,104.

As shown in the examples below, different modifiers were prepared to achieve a desired softening point, or Tg and molecular weight. Tables 5A and 5B below include the feed streams, polymerizing conditions and properties obtained for the exemplary hydrocarbon polymer modifiers.

TABLE 5A

| Hydrocarbon Polymer Modifiers | | | | | | |
|---|---|---|---|---|---|---|
| Feed streams | HPM B | HPM C | HPM D | HPM E | HPM G | HPM H |
| Cyclics (wt %) | 27.9 | 35.9 | 35.9 | 27.9 | 27.9 | 39.9 |
| Olefin | 58 | 44 | 44 | 58 | 58 | 50 |
| Aromatics (wt %) | | | | | | |
| MCPD (wt %) | 0.1 | 0.1 | 0.1 | 0.1 | 0.1 | 0.1 |
| Solvent (wt %) | 14 | 20 | 20 | 14 | 14 | 10 |
| Reaction temperature (° C.) | 275 | 275 | 273 | 275 | 265 | 275 |
| Reaction time (min) | 65 | 65 | 70 | 65 | 75 | 65 |

TABLE 5B

| Present HPM Properties Measured After Hydrogenation | | | | | | |
|---|---|---|---|---|---|---|
| HPM | B | C | D | E | G | H |
| HPM Softening Point (° C.) | 126 | 124 | 137 | 133 | 133 | 133 |

TABLE 5B-continued

| Present HPM Properties Measured After Hydrogenation | | | | | | |
|---|---|---|---|---|---|---|
| HPM | B | C | D | E | G | H |
| HPM Tg (° C.) | 75 | 76 | 89 | 80 | 87 | 88 |
| Mn (g/mol) | 372 | 354 | 379 | 386 | 384 | 389 |
| Mz (g/mol) | 720 | 600 | 637 | 800 | 700 | 667 |
| Mw/Mn (MWD) | 1.25 | 1.23 | 1.25 | 1.30 | 1.25 | 1.27 |
| Aromatic H (% H Ar) | 18 | 15 | 15 | 18 | 18 | 16 |

Tables 6A and 6B below include the feed streams, polymerizing conditions and properties obtained for comparative hydrocarbon polymer modifiers. As provided in Tables 6A and 6B, comparative examples B*, C* and D* were prepared with a vinyl aromatics feed stream consisting of styrene and vinyl toluene. Comparative example E* was prepared with a substituted benzene stream and aromatic distillation cut, but at a low Tg and high % H Ar. Comparative examples A, F and G* were prepared with an olefins aromatics stream, but at % H Ar and/or Tg outside the present HPMs. The relative rate of reaction of homo-oligomerization of vinyl aromatics is higher than copolymerization of cyclics and vinyl aromatics under the reaction condition of the present invention. The homo-oligomers formed exhibit higher Mn than desired for an optimum HPM. It is desirable to react substantially all of the theoretical amount of vinyl aromatics monomers with the cyclic feed to minimize the homo polymerization to form undesirable high molecular weight polymer.

The HPM can be a hydrogenated cyclopentadiene or a hydrogenated cyclopentadiene derivative with or without the aromatic component (olefin-aromatics, substituted benzene and aromatic distillation cut).

TABLE 6A

| Comparatives | | | | | | | |
|---|---|---|---|---|---|---|---|
| Feed streams | Comp. B* | Comp. C* | Comp. D* | Comp. E* | Comp. A | Comp. F | Comp G* |
| Cyclics | 30 | 40 | 19.4 | 19.4 | 27.9 | 31.9 | 35.9 |
| Olefin Aromatics | 0 | 0 | 0 | 0 | 58 | 48 | 44 |
| Vinyl Aromatics | 10 | 28 | 10 | 0 | 0 | 0 | 0 |
| Substituted benzene | 0 | 0 | 0 | 10 | 0 | 0 | 0 |
| Aromatic distillation | 45 | 0 | 68 | 68 | 0 | 0 | 0 |
| MCPD | 0 | 4.5 | 2.6 | 2.6 | 0.1 | 0.1 | 0.1 |
| Solvent | 15 | 27.5 | 0 | 0 | 14 | 20 | 20 |
| Reaction temperature (° C.) | 265 | 265 | 265 | 265 | 275 | 265 | 273 |
| Reaction time (min) | 60 | 60 | 60 | 60 | 65 | 75 | 70 |

TABLE 6B

| Comparatives Properties Measured After Hydrogenation | | | | | | | |
|---|---|---|---|---|---|---|---|
| Comparative | B* | C* | D* | E* | A | F | G* |
| HPM Softening Point (° C.) | 113 | 128 | 92 | 90 | 123 | 147 | 107 |
| HPM Tg (° C.) | 60 | 78 | 42 | 40 | 73 | 99 | 57 |
| Mn (g/mol) | 565 | 591 | 512 | 535 | 345 | 394 | 379 |
| Mz (g/mole) | 1886 | 4659 | 3010 | 2550 | 600 | 700 | 696 |
| Mw/Mn | 1.9 | 1.5 | 2.0 | 1.8 | 1.23 | 1.27 | 1.25 |
| Aromatic H (% H Ar) | 18 | 15 | 29 | 28 | 20.8 | 16 | 11.8 |

Figure 2:
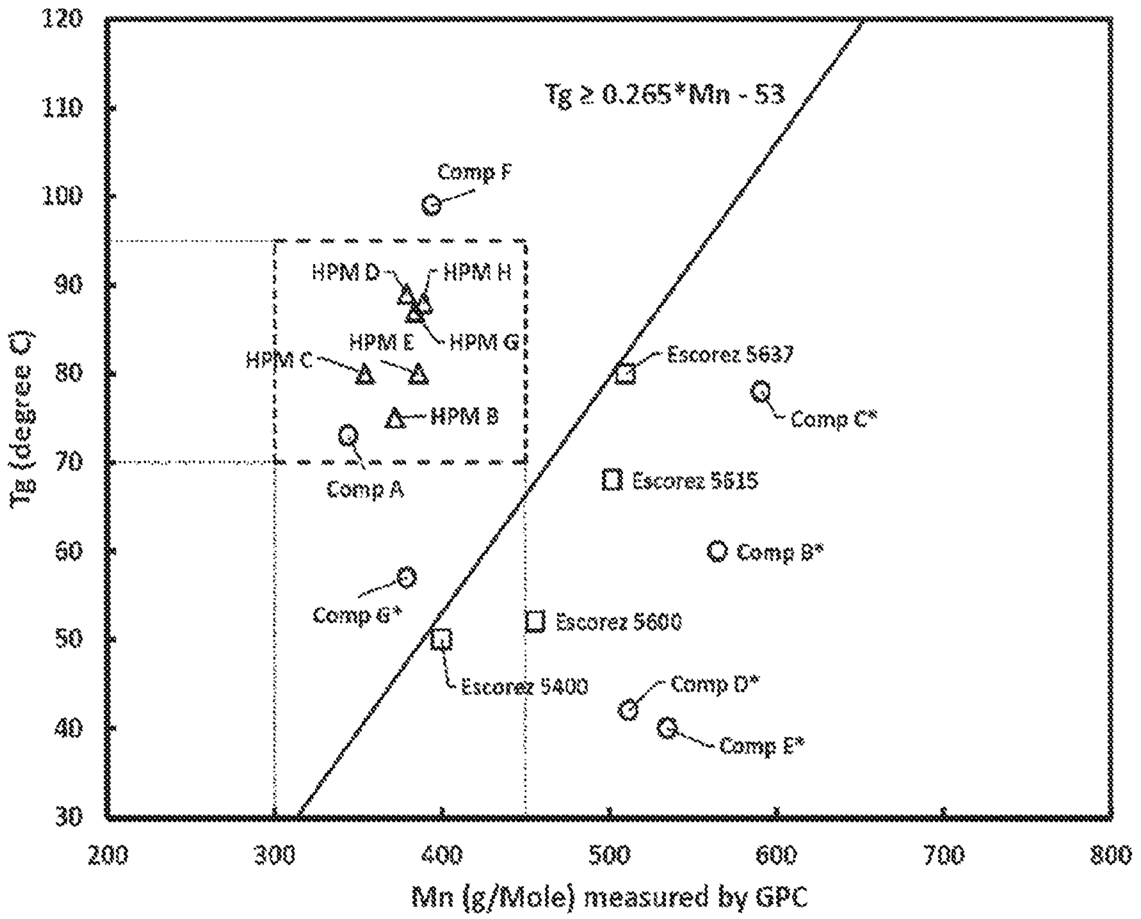
FIG. 2 is a graph of Tg and $M_n$ relationship of the present HPMs, comparative resins and prior art elastomeric compositions.
Figure 3:
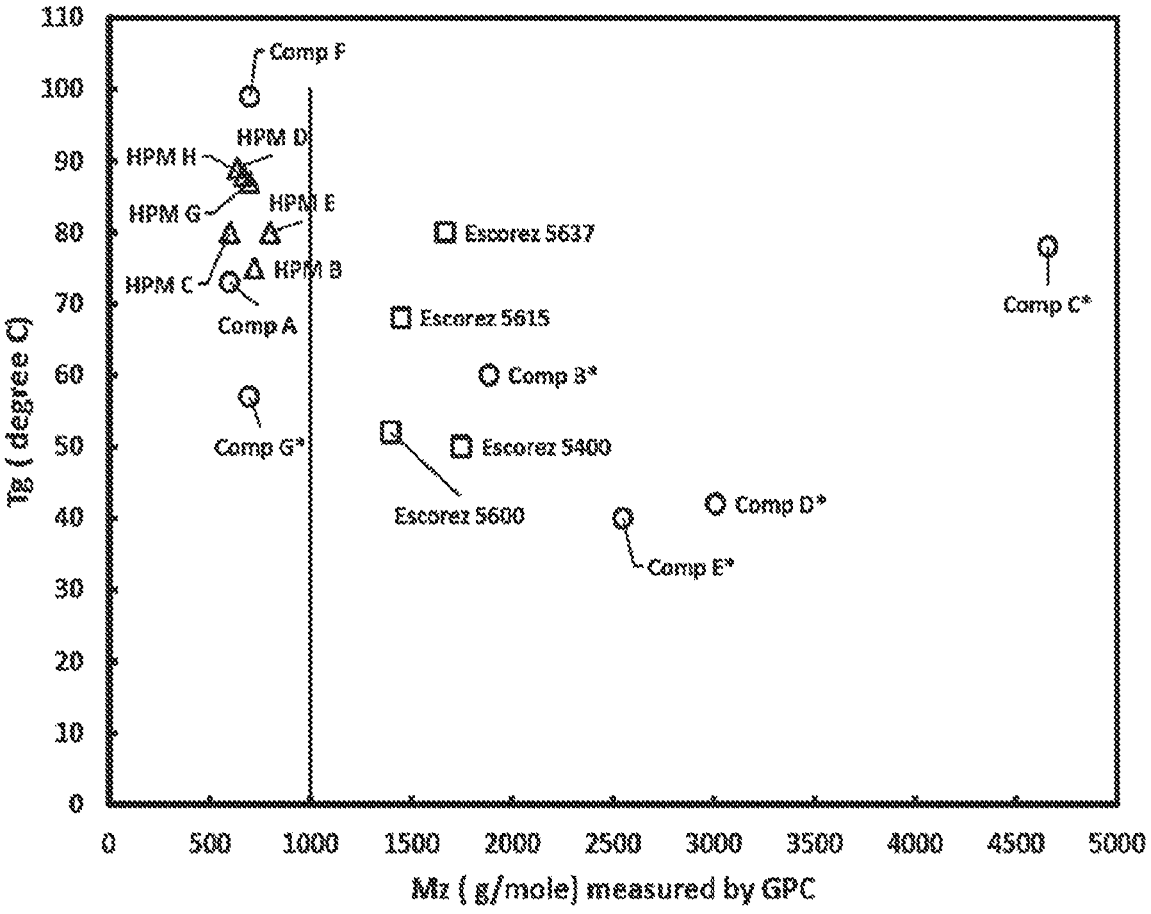
FIG. 3 is a graph of Tg and Mz relationship of the present HPMs, comparative resins and prior art elastomeric compositions.

FIG. 1 is a graph showing the Tg and % H Ar relationship of the present HPMs, comparative resins and prior art elastomeric compositions. FIG. 2 is a graph showing the Tg and Mn relationship of the present HPMs, comparative resins and prior art elastomeric compositions. FIG. 3 is a graph showing the Tg and Mz relationship of the present HPMs, comparative resins and prior art elastomeric compositions.

Example 3

Exemplary Rubber Compositions

Rubber compositions are manufactured with introduction of all of the constituents onto an internal mixer, with the exception of the vulcanization system. The vulcanization agents (sulfur and accelerator) are introduced onto an external mixer at low temperature (the constituent rolls of the mixer being at 30° C.).

The object of the examples presented in Table 7 is to compare the different rubber properties of control compositions (T1 to T3) to the properties of compositions having the present hydrocarbon resin HPM H (C1 and C2). The properties measured, after curing, are presented in Table 8. In Table 7, component values are expressed in phr (parts per hundred rubber).

TABLE 7

| Rubber Composition of Different hydrocarbon polymer modifiers | | | | | |
|---|---|---|---|---|---|
| | T1 | C1 | T2 | T3 | C2 |
| SBR (1) | 100 | 100 | — | — | — |
| BR (2) | — | — | 100 | 100 | 100 |
| Carbon black (3) | 3 | 3 | 4 | 4 | 4 |
| Silica (4) | 70 | 70 | 130 | 130 | 130 |
| Escorez 5600 | 39 | — | 95.4 | — | — |
| Escorez 5615 | — | — | — | 95.4 | — |
| HPM H | — | 39 | — | — | 95.4 |
| Antioxidant (5) | 6 | 6 | 8.85 | 8.85 | 8.85 |
| Coupling agent (6) | 5.6 | 5.6 | 13 | 13 | 13 |
| DPG (7) | 1.6 | 1.6 | 2.4 | 2.4 | 2.4 |
| Stearic acid (8) | 2 | 2 | 3 | 3 | 3 |
| ZnO (9) | 0.9 | 0.9 | 0.9 | 0.9 | 0.9 |
| Accelerator (10) | 2.45 | 2.45 | 2.3 | 2.3 | 2.3 |
| Soluble sulfur | 1 | 1 | 0.7 | 0.7 | 0.7 |

(1) Non-functionalized SBR, having 26.5% by weight of styrene unit relative to the total weight of the copolymer and 24 mol % of unit 1, 2 of butadiene relative to the butadiene part and having a glass transition temperature, Tg, of −48° C.

(2) BR: polybutadiene «CB24» from Lanxess; 96% of 1,4-cis; Tg=−107° C.

(3) Carbon black, ASTM N234 grade (4) Silica, Zeosil 1165 MP from Solvay, HDS type (5) N-(1,3-Dimethylbutyl)-N'-phenyl-p-phenylenediamine (Santoflex 6-PPD) from Flexsys and 2,2,4-trimethyl-1,2-dihydroquinoline (TMQ)

(6) Coupling agent: Si69 from Evonik—Degussa (7) Diphenylguanidine, Perkacit DPG from Flexsys (8) Stearin, Pristerene 4931 from Uniqema (9) Zinc oxide, industrial grade—Umicore

(10) N-Cyclohexyl-2-benzothiazolesulfenamide (Santocure CBS from Flexsys)

TABLE 8

| Rubber Composition Properties | | | | | |
|---|---|---|---|---|---|
| | T1 | C1 | T2 | T3 | C2 |
| G* 10% at 23° C. (base 100) | 100% | 106% | 100% | 109% | 121% |
| G* 10% at 40° C. (base 100) | 100% | 101% | 100% | 103% | 107% |

Relative to the control compositions, it is noted that the composition T1 and T2, which are not in accordance with hydrocarbon polymer modifiers described herein, respectively serve as base 100 for comparing the performance of the other compositions. It is noted that only the compositions C1 and C2, according to the invention, enable improvement in road handling performance.

Example 4

Several types of hot melt adhesive compositions comprising the present HPMs were formulated and evaluated.

Hotmelt Pressure Sensitive Adhesives

Pressure sensitive adhesives can be used for tapes, label and/or nonwoven (diaper, feminine hygiene or adult incontinence) applications. Pressure sensitive adhesives blends were prepared using a Brabender mixer using roller blades and sigma blades at a temperature between about 130° C. and about 180° C. An antioxidant was added to an adhesive base polymer, and the resulting mixture was initially masticated in the Brabender mixer. After several minutes, a tackifier and/or other HPM and an oil were added, and the combined mixture was blended for about 20 to about 45 minutes, until the mixer torque plateaued. Tables 9A and 9B, below, summarize the specific formulations and evaluation of pressure sensitive adhesives using different HPMs described herein.

TABLE 9A

| | S1 | S2 | S3 | S4 | S5 |
|---|---|---|---|---|---|
| Materials | Amount in Grams (gm) | | | | |
| Vector 8508A | 105 | 105 | 84 | | |
| Vector 4111A | | | 21 | 100 | |
| Taipol 6150 | | | | | 100 |
| Escorez 5400 | | | | 95 | 95 |
| HPM D | 113.75 | | 113.75 | 23.75 | 23.75 |
| Comp G* | | 113.75 | | | |
| Nyflex 222 | 30 | 30 | 30 | 30 | 30 |
| Irganox 1010 | 1.25 | 1.25 | 1.25 | 1.25 | 1.25 |
| Sum | 250 | 250 | 250 | 250 | 250 |
| Evaluation Results | | | | | |
| Brookfield Viscosity at 177° C. (Cp) | 45550 | 17150 | 39950 | 16280 | |
| Brookfield Viscosity at 200° C. (Cp) | 24100 | 8975 | 20000 | 7021 | |
| Rheology (Anton Parr) - Temp sweep method | | | | | |
| Tg (Tan δ), ° C. | 14.1 | 4.1 | 12.1 | 4.1 | 6.1 |
| Tan δ Peek Height | 1.04 | 1.32 | 1.09 | 2.63 | 1.43 |
| G' (Storage Modulus) at 25° C., kPa | 629.2 | 285.9 | 501.6 | 84.8 | 428.8 |

TABLE 9A-continued

| Materials | S1 | S2 | S3 | S4 | S5 |
|---|---|---|---|---|---|
| | Amount in Grams (gm) | | | | |
| 90° Peel (PSTC 101) | | | | | |
| SS (stainless steel) (g) | 537 | 519 | 936 | 1543 | |
| LDPE (g) | 86 | 184 | 135 | 704 | |
| Aged(30 day): SS (stainless steel) (g) | 756 | 486 | 904 | 1453 | |
| Aged(30 day): LDPE (g) | 112 | 222 | 171 | 837 | |
| Loop Tack (PSTC 16, Method B) | | | | | |
| SS (stainless steel) (g) | 545 | 892 | 797 | 1953 | |
| LDPE (g) | 141 | 380 | 225 | 1283 | |
| Aged(30 day): SS (stainless steel) (g) | 427 | 824 | 662 | 1866 | |
| Aged(30 day): LDPE (g) | 128 | 417 | 125 | 1543 | |
| Hold Power/Shear (Rm Temp) - (PSTC 107 Modified; 0.5' × 0.5' with 0.5'on substrate) | | | | | |
| SS (stainless steel) (min) | | 957 | | 3507 | |
| LDPE (min) | | | | | |
| Aged(30 day): SS (stainless steel) (min) | | 1651 | | 3689 | |
| Aged(30 day): LDPE (min) | | | | 5625 | |

TABLE 9B

| | S6 | S7 | S8 | S9 | S10 | S11 |
|---|---|---|---|---|---|---|
| Materials | Amount in Grams (gm) | | | | | |
| Vector 8508A | 50 | 62.5 | 62.5 | 62.5 | 50 | 50 |
| Vector 4111A | | | | | 12.5 | |
| Taipol 6150 | | | | | | 12.5 |
| Escorez 5600 | 148.75 | | | | | |
| Escorez 5637 | | 136.25 | | | | |
| HPM D | | | 136.25 | | 136.25 | 136.25 |
| Comp G* | | | | 136.5 | | |
| Nyflex 222 | 50 | 50 | 50 | 50 | 50 | 50 |
| Irganox 1010 | 1.25 | 1.25 | 1.25 | 1.25 | 1.25 | 1.25 |
| Sum | 250 | 250 | 250 | 250.25 | 250 | 250 |
| Evaluation Results | | | | | | |
| Brookfield Viscosity at 177° C. (Cp) | 945 | 3564 | 4064 | 1503 | 2463 | 3908 |
| Brookfield Viscosity at 200° C. (Cp) | 489 | 1854 | 1975 | 791 | 1279 | 1958 |
| Rheology (Anton Parr) - Temp sweep method | | | | | | |
| Tg (Tan δ), ° C. | 22.1 | 17.1 | 20.1 | 18.1 | 30.1 | 34.1 |
| Tan δ Peek Height | 4.72 | 2.75 | 2.48 | 3.59 | 3.38 | 2.27 |
| G' (Storage Modulus) at 25° C., kPa | 77.7 | 106.1 | 158.9 | 58.8 | 608.6 | 2215.6 |

As seen from the data provided above, pressure sensitive adhesive blends containing HPM show excellent balance of rheology, peel, tack and shear performance for use in various applications described herein.

Hot melt packaging adhesives (also referred to herein as "adhesives") were prepared using a paddle type agitator mixer in a pint sized can. Adhesive base polymer and an antioxidant were combined in a pint-sized can. The resulting mixture was agitated with a paddle-type agitator controlled with a variable speed motor and heated with a heating mandrel/element to about 150° C. to about 180° C. under a nitrogen blanket. After the polymer is melted, a wax and a tackifier were introduced into the can and the resulting mixture was agitated for an additional 30 minutes until a homogenous mixture was obtained. Table 10 below summarizes the specific compositions and performance analysis results of each of packaging adhesives using the present HPMs.

TABLE 10

| Packaging Adhesive Performance for Present Adhesive Compositions | | | | | | | | |
|---|---|---|---|---|---|---|---|---|
| | S12 | S13 | S14 | S15 | S16 | S17 | S18 | S19 |
| Materials | Amount in Grams (gm) | | | | | | | |
| Affinity GA1950 | 35 | 35 | 35 | 35 | | | | |
| Vistamaxx 8880 | | | | | 70 | 70 | 70 | 70 |
| Sasol H1 Wax | 29.5 | 29.5 | 29.5 | 29.5 | | | | |

TABLE 10-continued

| Packaging Adhesive Performance for Present Adhesive Compositions | | | | | | | | |
|---|---|---|---|---|---|---|---|---|
| | S12 | S13 | S14 | S15 | S16 | S17 | S18 | S19 |
| AC 325 | | | | | 2 | 2 | 2 | 2 |
| Epolene N-15 | | | | | 10 | 10 | 10 | 10 |
| Escorez 5600 | 35 | | | | 17.5 | | | |
| Escorez 5637 | | 35 | | | | 17.5 | | |
| HPM D | | | 35 | | | | 17.5 | |
| Comp G* | | | | 35 | | | | 17.5 |
| Irganox 1010 | 0.5 | 0.5 | 0.5 | 0.5 | 0.5 | 0.5 | 0.5 | 0.5 |
| Sum | 100 | 100 | 100 | 100 | 100 | 100 | 100 | 100 |
| Evaluation Results | | | | | | | | |
| Brookfield Viscosity at 177° C. (Cp) | 614 | 689 | 740 | 615 | 1232 | 1340 | 1338 | 1222 |
| SAFT (° C.) | 43 | 55 | 65 | 71 | 88 | 91 | 91 | 90 |
| Fiber Tear RT (%) | 85 | 98 | 88 | 96 | 99 | 98 | 99 | 100 |
| Fiber Tear 2° C. (%) | 91 | 95 | 83 | 75 | 92 | 97 | 98 | 95 |
| Fiber Tear −18° C. (%) | 98 | 96 | 66 | 98 | 97 | 99 | 59 | 98 |
| Set time (Sec) | 2.7 | 1.2 | 1.7 | 0.5 | 2.5 | 1 | 1 | 1 |
| Rheology - Temp sweep method | | | | | | | | |
| G' (Storage Modulus) at 25° C., kPa | 9240 | 17998 | 10280 | 12219 | 13381 | 15500 | 13501 | 14451 |

As seen from the data provided above, packaging adhesive blends containing HPM show excellent balance of rheology, adhesion, SAFT, fiber tear and set time performance for use in various applications described herein.

In the specification and in the claims, the terms "including" and "comprising" are open-ended terms and should be interpreted to mean "including, but not limited to . . . " These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

The invention claimed is:

1. A hydrocarbon polymer modifier comprising a cyclic component and an aromatic component, wherein the hydrocarbon polymer modifier has a glass transition temperature and number average molecular weight that is represented by Tg≥95−2.2*(% H Ar) and Tg≥−53+(0.265*Mn), an aromatic proton content (% H Ar) of from 12 mole % to 19 mole %, and an Mn of from 300 g/mole to 450 g/mole, wherein Tg is the glass transition temperature expressed in ° C., % H Ar is the content of aromatic protons of the hydrocarbon polymer modifier, Mn represents the number average molecular weight of the hydrocarbon polymer modifier, and the cyclic component is selected from the group of a distillation cut from a petroleum refinery stream, and/or $C_4$, $C_5$ or $C_6$ cyclic olefins and mixtures thereof.

2. The hydrocarbon polymer modifier of claim 1, wherein the hydrocarbon polymer modifier is further characterized by a Tg of from 70° C. to 95° C.

3. The hydrocarbon polymer modifier of claim 1, wherein the hydrocarbon polymer modifier is further characterized by a Z-average molecular weight ($M_z$) of less than 1000 g/mole.

4. The hydrocarbon polymer modifier of claim 1, wherein the cyclic component is cyclopentene, cyclopentadiene, dicyclopentadiene, cyclohexene, 1,3-cyclohexadiene, 1,4-cyclohexadiene, methylcyclopentadiene, and/or di(methylcyclopentadiene).

5. The hydrocarbon polymer modifier of claim 1, wherein the hydrocarbon polymer modifier comprises the cyclic component in an amount between 10 wt. % to about 90 wt. %.

6. The hydrocarbon polymer modifier of claim 1, wherein the hydrocarbon polymer modifier comprises the cyclic component in an amount between 25 wt. % to about 80 wt. %.

7. The hydrocarbon polymer modifier of claim 1, wherein the cyclic component is selected from the group of dicyclopentadiene, cyclopentadiene, and methylcyclopentadiene.

8. The hydrocarbon polymer modifier of claim 1, wherein the cyclic component is cyclopentadiene.

9. The hydrocarbon polymer modifier of claim 1, wherein the aromatic component is selected from one of an olefin aromatic, a substituted benzene or an aromatic distillation cut.

10. The hydrocarbon polymer modifier of claim 9, wherein the aromatic component is an olefin aromatic.

11. The hydrocarbon polymer modifier of claim 7, wherein the hydrocarbon polymer modifier comprises dicyclopentadiene, cyclopentadiene, and/or methylcyclopentadiene in an amount between about 10 wt. % to about 90 wt. %.

12. The hydrocarbon polymer modifier of claim 7, wherein the hydrocarbon polymer modifier comprises dicyclopentadiene, cyclopentadiene, and/or methylcyclopentadiene in an amount between about 25 wt. % to about 80 wt. %.

13. The hydrocarbon polymer modifier of claim 7, wherein the hydrocarbon polymer modifier comprises methylcyclopentadiene in an amount between about 0.1 wt. % to about 15 wt. %.

14. The hydrocarbon polymer modifier of claim 7, wherein the hydrocarbon polymer modifier comprises methylcyclopentadiene in an amount between about 0.1 wt. % to about 5 wt. %.

15. The hydrocarbon polymer modifier of claim 1, wherein the aromatic component comprises an olefinic-aromatic compound of the Formula I Formula I

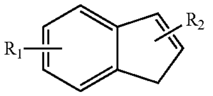

wherein $R_1$ and $R_2$ represent, independently of one another, a hydrogen atom, an alkyl group, alkenyl group, a cycloalkyl group, an aryl group or an arylalkyl group.

16. The hydrocarbon polymer modifier of claim 1, wherein the aromatic component comprises a substituted benzene derivative compound of Formula II Formula II

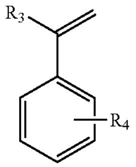

wherein $R_3$ and $R_4$ represent, independently of one another, a hydrogen atom, an alkyl group, alkenyl group, a cycloalkyl group, an aryl group or an arylalkyl group, alpha-methylstyrene or substituted alpha-methylstyrenes having one or more substituents on the aromatic ring wherein the substituents are selected from alkyl, cycloalkyl, or aryl, each having one to eight carbon atoms per substituent.

17. The hydrocarbon polymer modifier of claim 1, wherein the aromatic component comprises an aromatic distillation cut comprising styrene, alkyl substituted derivatives of styrene, indene, alkyl substituted derivatives of indene, and/or mixtures thereof.

18. The hydrocarbon polymer modifier of claim 1, wherein the hydrocarbon polymer modifier comprises the aromatic component in an amount between about 20 wt. % to about 75 wt. %.

19. The hydrocarbon polymer modifier of claim 1, wherein the hydrocarbon polymer modifier comprises the aromatic component in an amount between about 25 wt. % to about 70 wt. %.

20. The hydrocarbon polymer modifier of claim 1, wherein the hydrocarbon polymer modifier has at least one of the following additional features:

a glass transition temperature (Tg) represented by $Tg \geq 100-2.2*(H\ Ar)$, a glass transition temperature (Tg) represented by $Tg \geq -32+(0.265*Mn)$, a number average molecular weight (Mn) of between 350 and 420 g/mol, or a Tg of from 70° C. to 90° C.

21. An adhesive composition comprising the hydrocarbon polymer modifier of claim 1, where the adhesive composition comprises the hydrocarbon polymer modifier in an amount between about 0.1 wt. % to about 99.5 wt. %.

22. A method of making the hydrocarbon polymer modifier of claim 1, comprising the step of polymerizing a feed stream comprising a cyclic component in the presence or absence of a solvent at a reaction temperature between about 250° C. and 290° C. for about one hour to about three hours.

* * * * *